Figure 1:
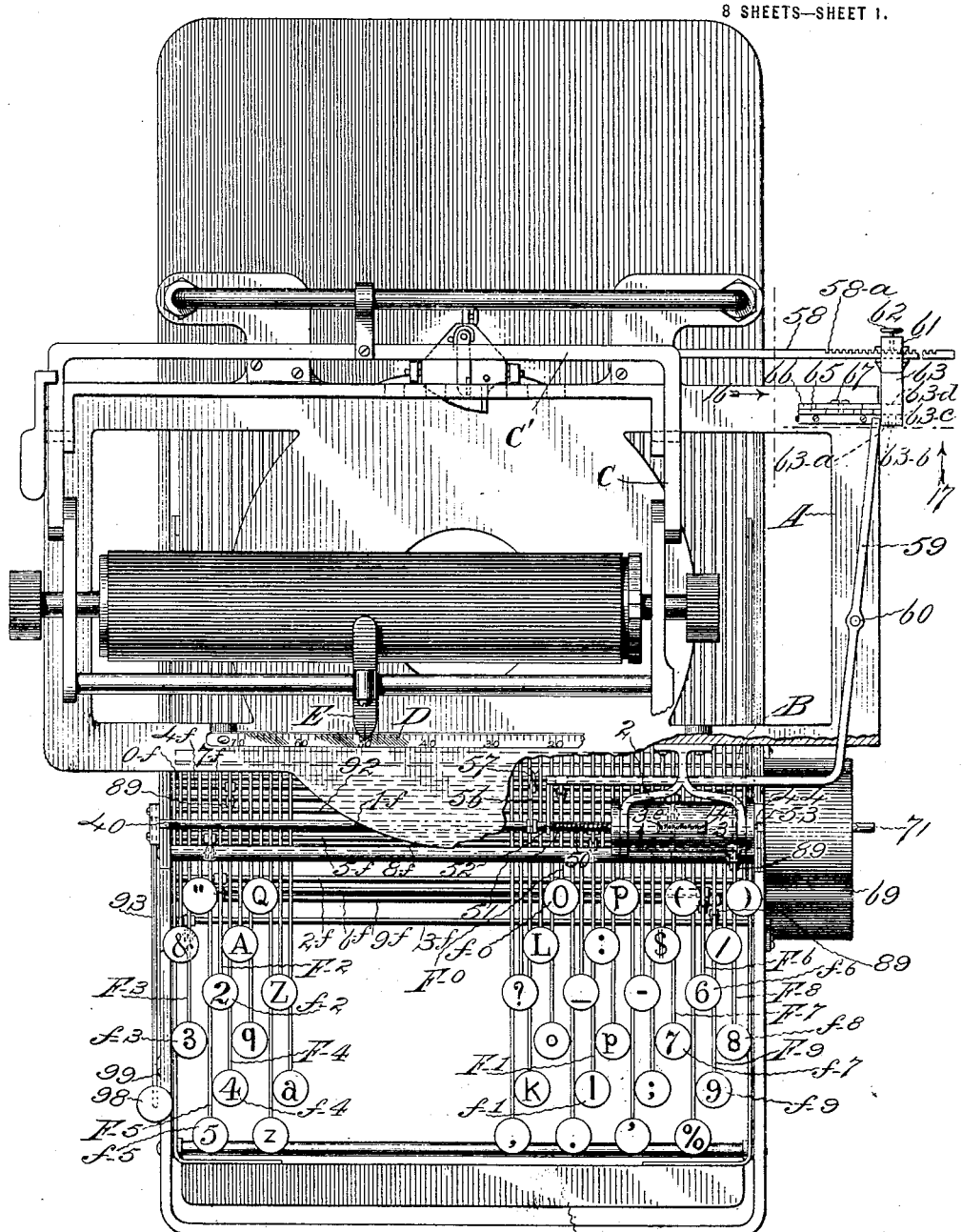

B. M. DES JARDINS.
COMPUTING ATTACHMENT FOR TYPEWRITERS.
APPLICATION FILED JAN. 14, 1899. RENEWED SEPT. 26, 1912.

1,163,616.

Patented Dec. 7, 1915.
8 SHEETS—SHEET 1.

Witnesses:
William E. Neff
C. E. Rockland

Inventor:
Benj. M. Des Jardins
By J. M. Watson,
Atty.

B. M. DES JARDINS.
COMPUTING ATTACHMENT FOR TYPEWRITERS.
APPLICATION FILED JAN. 14, 1899. RENEWED SEPT. 26, 1912.
1,163,616.
Patented Dec. 7, 1915.
8 SHEETS—SHEET 2.
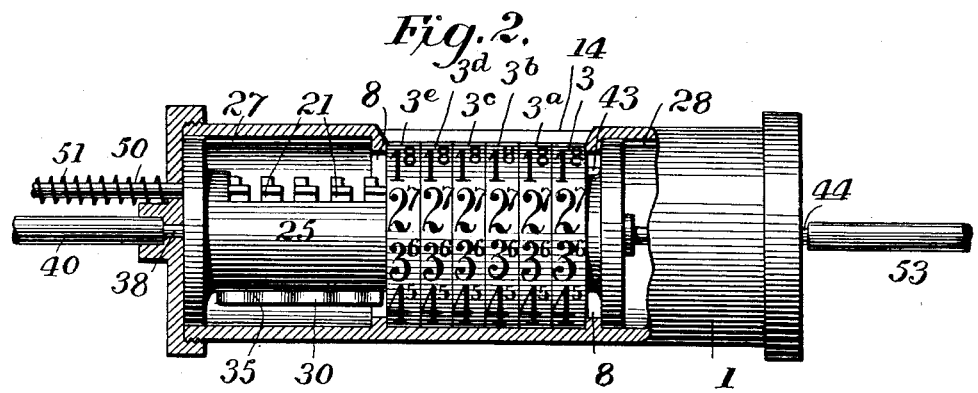
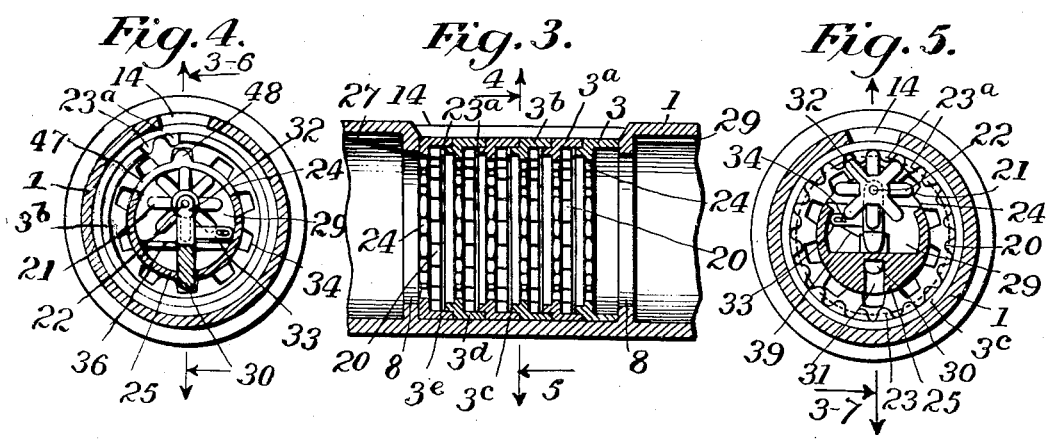
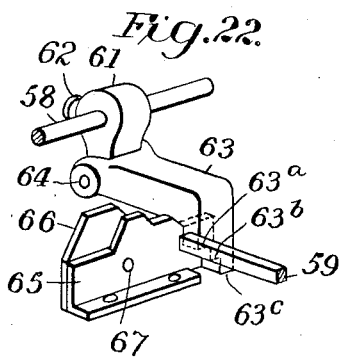
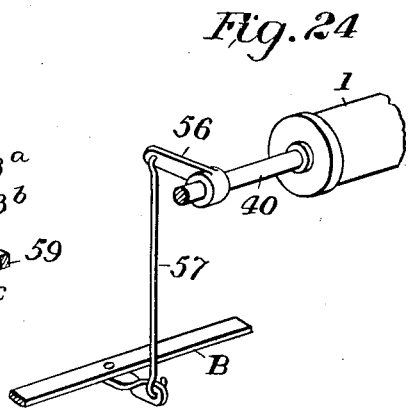
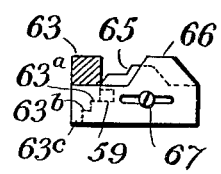

B. M. DES JARDINS.
COMPUTING ATTACHMENT FOR TYPEWRITERS.
APPLICATION FILED JAN. 14, 1899. RENEWED SEPT. 26, 1912.
1,163,616.
Patented Dec. 7, 1915.
8 SHEETS—SHEET 3.
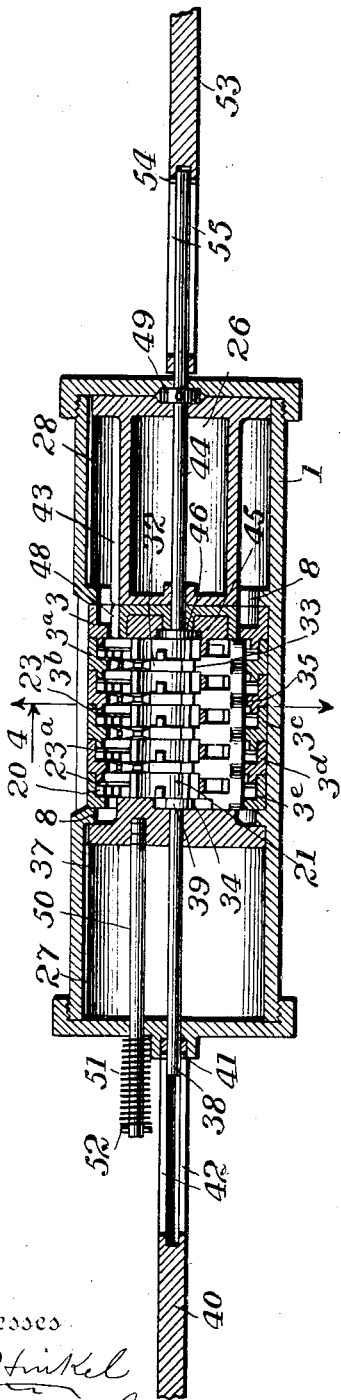
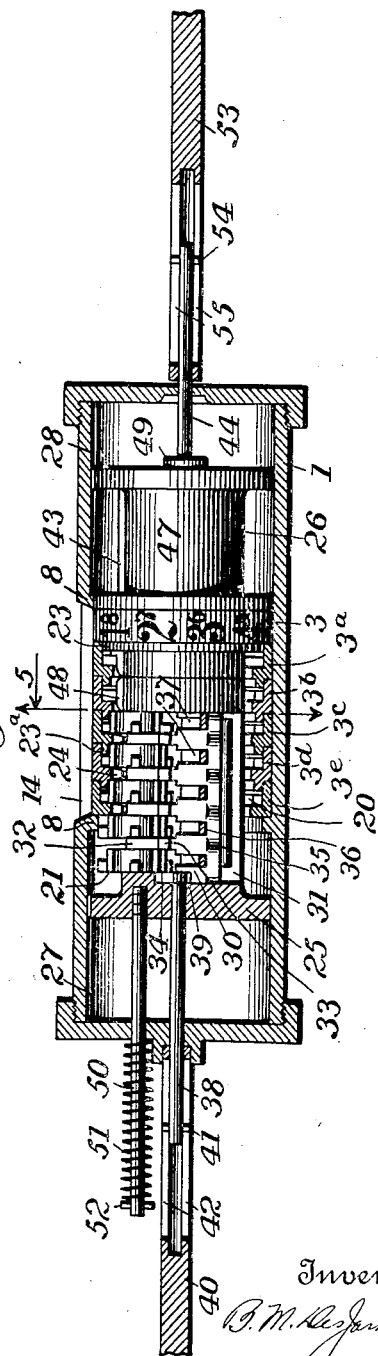

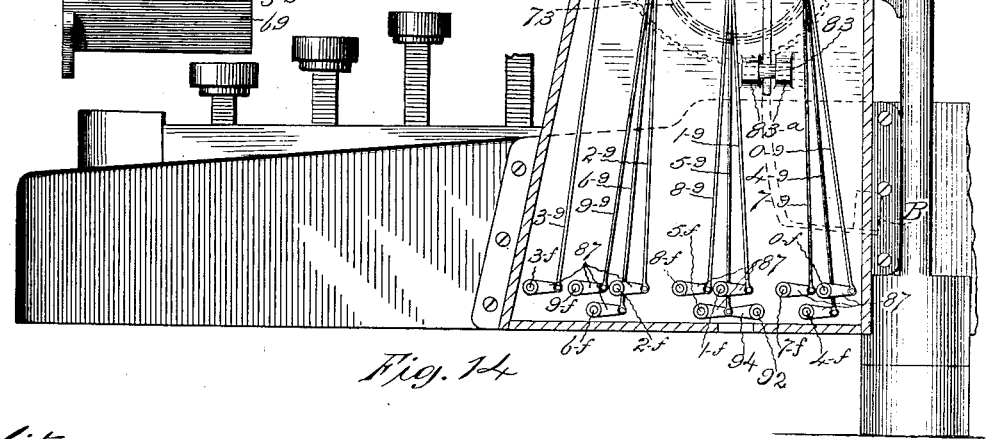

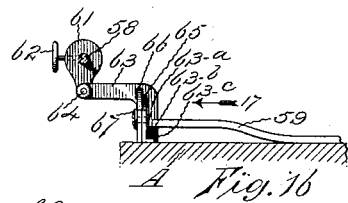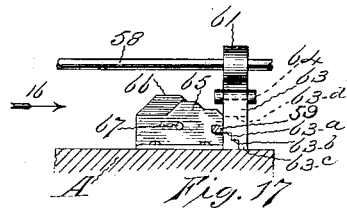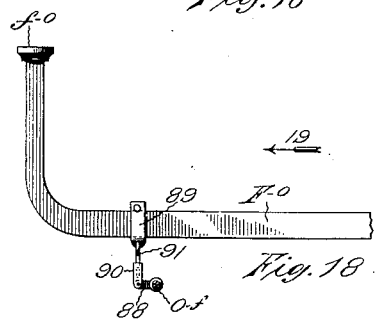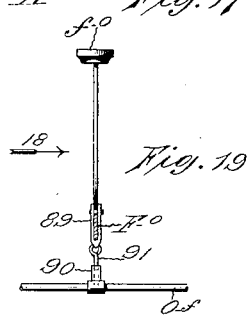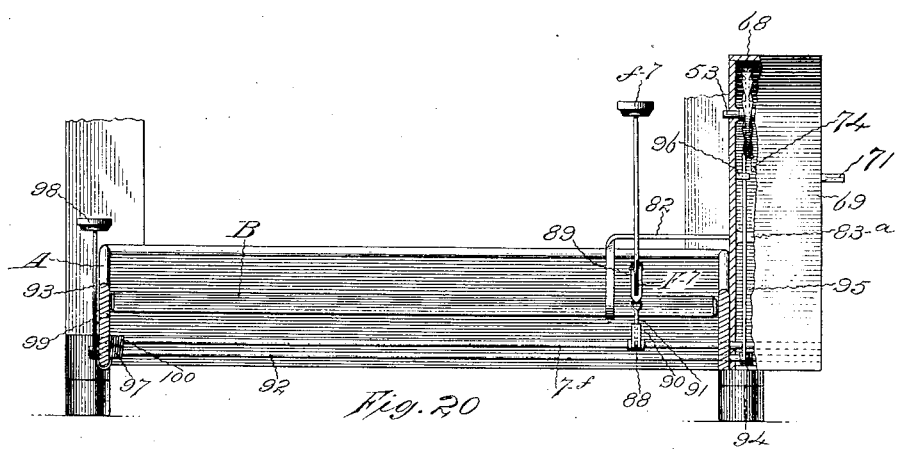

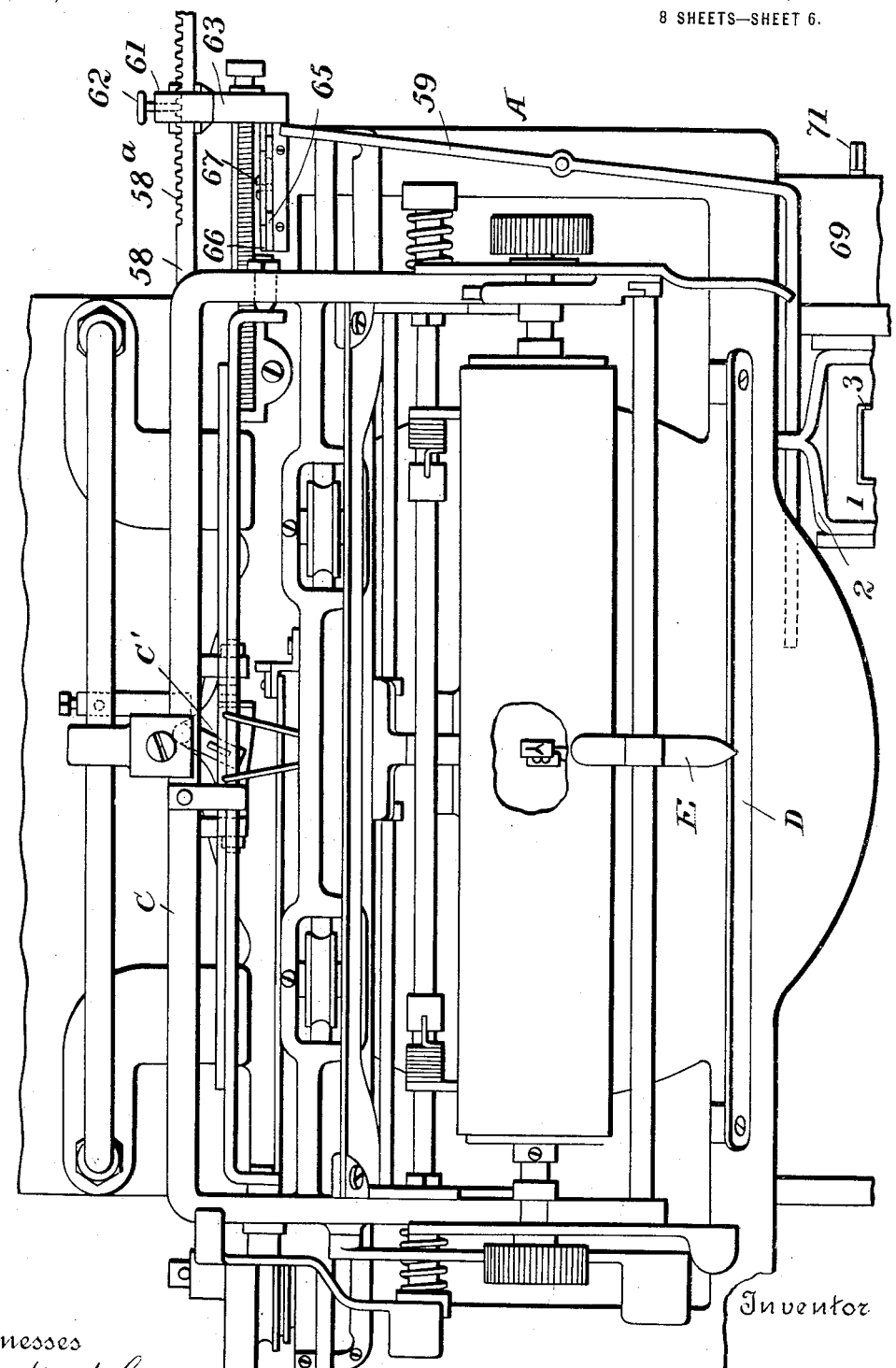

B. M. DES JARDINS.
COMPUTING ATTACHMENT FOR TYPEWRITERS.
APPLICATION FILED JAN. 14, 1899. RENEWED SEPT. 26, 1912.
1,163,616.
Patented Dec. 7, 1915.
8 SHEETS—SHEET 7.
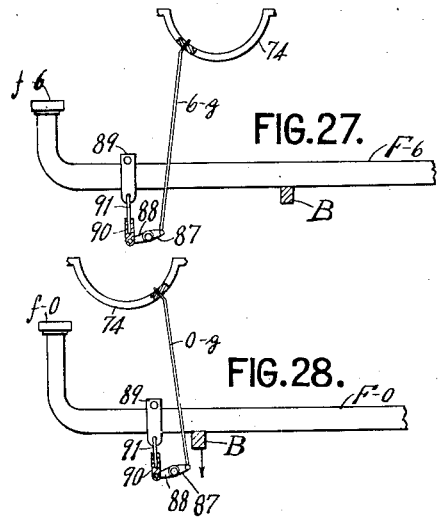
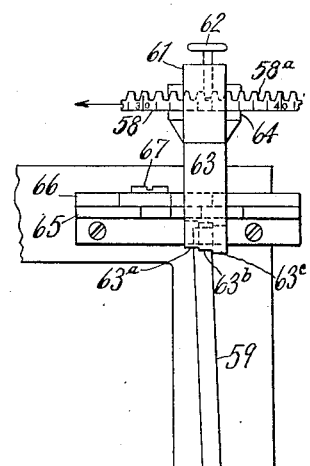
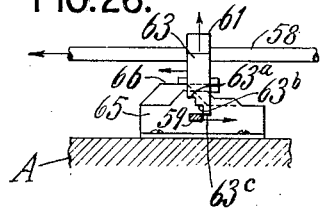
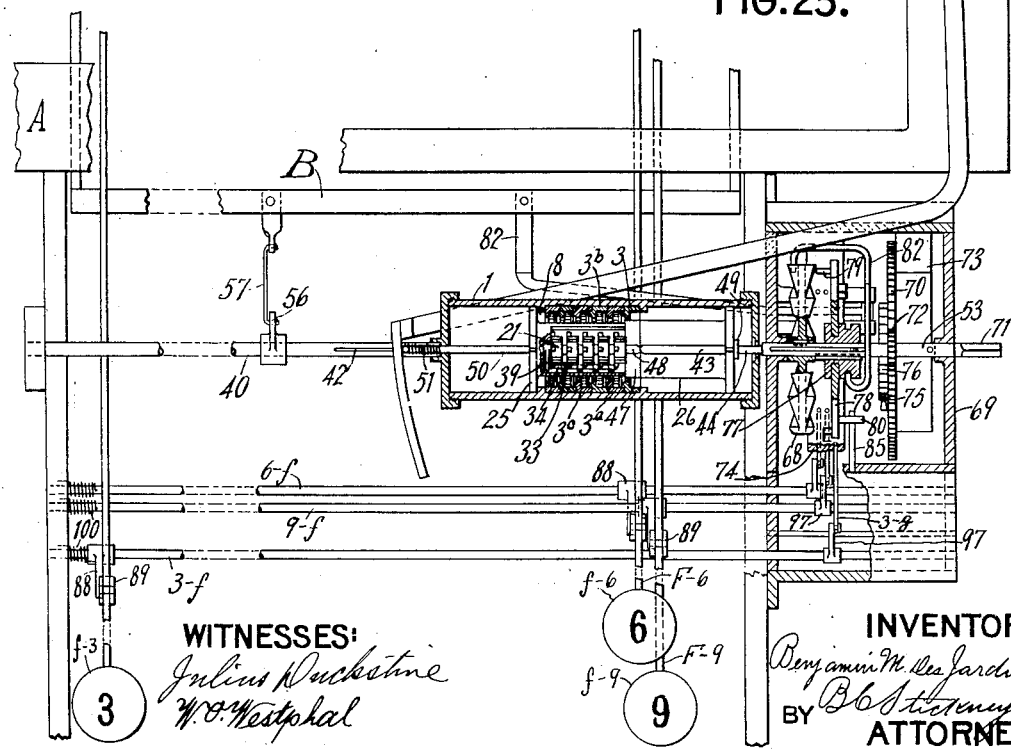
WITNESSES:
INVENTOR:
Benjamin M. Des Jardins
BY
ATTORNEY.

B. M. DES JARDINS.
COMPUTING ATTACHMENT FOR TYPEWRITERS.
APPLICATION FILED JAN. 14, 1899. RENEWED SEPT. 26, 1912.
1,163,616.
Patented Dec. 7, 1915.
8 SHEETS—SHEET 8.
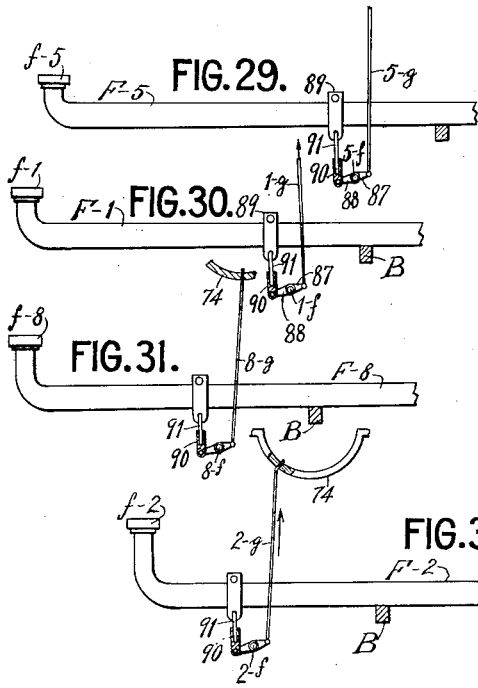
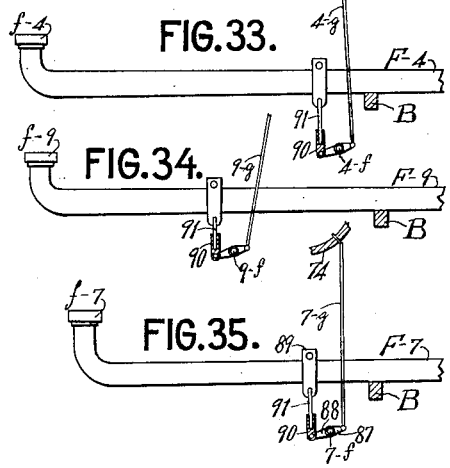
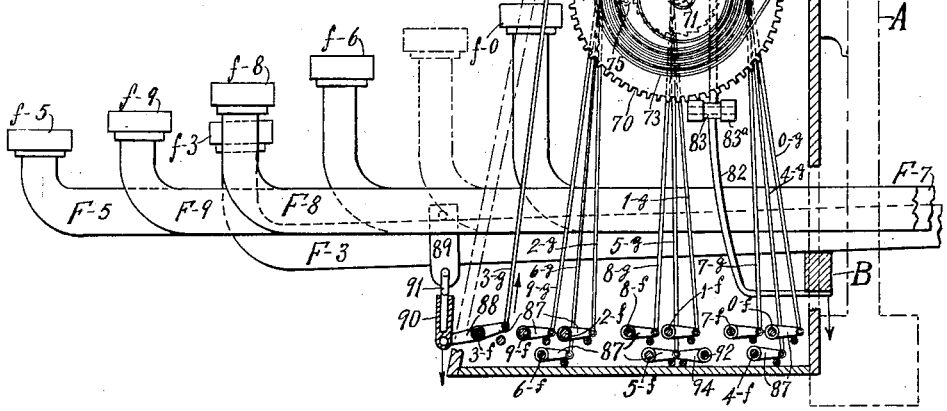
WITNESSES:
Julius Duckstine
W. O. Westphal
INVENTOR:
Benjamin M. Des Jardins
BY B. C. Stickney
ATTORNEY.

UNITED STATES PATENT OFFICE.

BENJAMIN M. DES JARDINS, OF WEST HARTFORD, CONNECTICUT, ASSIGNOR, BY MESNE ASSIGNMENTS, TO JOHN T. UNDERWOOD, OF BROOKLYN, NEW YORK.

COMPUTING ATTACHMENT FOR TYPE-WRITERS.

1,163,616.  Specification of Letters Patent.  Patented Dec. 7, 1915.

Application filed January 14, 1899, Serial No. 702,163. Renewed September 26, 1912. Serial No. 722,528.

*To all whom it may concern:*

Be it known that I, BENJAMIN M. DES JARDINS, a citizen of the United States, residing at West Hartford, in the county of Hartford and State of Connecticut, have invented certain new and useful Improvements in Computing Attachments for Type-Writers, of which the following is a specification.

My invention relates to improvements in computing registers specifically applicable to type-writers, and broadly considered consists of means by which the figures printed or written by said type-writer are automatically computed as fast as they are written.

The present embodiment of my invention may be said to consist, essentially, of a series of coaxial revoluble indicator-rings or bands having figures delineated thereon, with automatic, mechanical means for turning one or more of said rings simultaneously with the manipulation of any one of the figure-keys of the writing machine.

The objects of my improvement are, first, to produce an automatic computing device that can be attached to, and operated by, type-writers; second, to provide such a device capable of computing figures, as rapidly as they can be written by the operator, with absolute accuracy and without retarding the speed, impeding, or interfering in any way with the usual or ordinary manner of manipulating the writing machine; third, by incorporating this device with a type-writer of any of the standard grades, to convert the same into a computing as well as a writing machine; fourth, to furnish a comparatively simple and inexpensive mechanical means for calculating figures as they are written, whereby the same is brought within reach of the average man or woman who possesses a type-writer; and fifth, to provide a device which insures the proper results whether operated by an expert or a non-expert, the only requirement being the figures shall be indicated by striking the particular type-writer keys that represent said figures and cause them to be printed, the carriage of the writing machine being suitably located at the beginning of each number, as must be done in any event, in order to assemble the different numbers into column formation.

Different arrangements of the parts from those herein shown and described, for producing the desired results, may be employed, together with mechanical equivalents of some or all of said parts, but I have utilized the present combinations for the production of a serviceable and practical register, with the intention of claiming broadly the application of a calculator to a type-writer.

With the present invention I am able to obtain results from any writing machine to which my device can be attached, heretofore unattainable, thereby greatly enhancing the value and practicability of the machine as a labor-saving and time-economizing factor in the various uses to which it is applied.

It will be understood that this computing register can be attached to an old machine, as well as to a new one, with comparatively little trouble, and, when in place upon any machine, does not interfere with the regular movements of the same, whether said register is in use or not.

I attain the objects specified above, by the mechanism illustrated in the accompanying drawings, in which—

Figure 1 is a top view of a type-writer frame, carriage, and a part of the keys, with my invention incorporated therewith; Fig. 2, a front view and partial section of the register case and contents, showing the reciprocating members therein, at the beginning of their travel; Fig. 3, a longitudinal, vertical section through the indicator-rings in said case; Fig. 4, a transverse, vertical section through the case and contents, in the direction of the indicator arrows 4, Figs. 3 and 6; Fig. 5, a similar section to the latter, in the direction of the arrows 5, Figs. 3 and 7; Fig. 6, a longitudinal, vertical section in the direction of the arrow 6, Fig. 4, showing the reciprocating members in the case at the end of their travel, with the blade and pinions depressed; Fig. 7, a similar section to the latter, in the direction of the arrow 7, Fig. 5, showing said members occupying an intermediate position, with said blade and pinions elevated; Fig. 8, a side view of the locking-blade; Figs. 9, 10 and 11, end and bottom views of said blade, in the directions of the arrows 9, 10, and 11, respectively, Fig. 8; Fig. 12, a longitudinal, vertical section through the pinion-block, in the direction of the arrow 12, Fig. 13; Fig. 13, a top view of said block as indicated by the arrow 13, Fig. 12; Fig. 14, a right side view of a part of the type-writer frame, showing the interior of the case containing the escapement mechanism, the clock-movement connected therewith being in dotted lines to permit the parts behind the same to be seen; Fig. 15, a horizontal section through said last mentioned case, in the direction of the arrow 15, Fig. 14, looking down onto said escapement mechanism; Fig. 16, a side view of the connection between the carriage and the driver-actuating arm, in the direction of the arrows 16, Figs. 1 and 17; Fig. 17, a front view of said connection, as indicated by the arrows 17, Figs. 1 and 16; Fig. 18, a side view of a figure key showing the connection between the same and one of the stop-finger rock-shafts, in the direction of the arrow 18, Fig. 19; Fig. 19, a rear view of said figure-key connection, as indicated by the arrow 19, Fig. 18; Fig. 20, a front view of the cut-out device. Fig. 21 is a plan view, on an enlarged scale, of a part of the typewriter, showing the carriage and escapement devices, a portion of the platen being removed to show a letter and figure type; Figs. 22 and 23 are detail views of the means for controlling the operation of the devices for transmitting movement from the typewriter carriage to the sliding member of the computing mechanism; Fig. 24 is a detail view of the connection between the rock shaft controlling the movement of the locking devices of the computing mechanism and a bar actuated by the figure keys of the typewriter. Fig. 25 is a plan view of the connections between the typewriter carriage and the computing device at the moment when the master wheel is engaged with the units or lowest computing wheel. Many parts in this figure are broken away, so as to show the connections more particularly between the typewriter universal bar and the computing mechanism. Fig. 26 is a front view of the lug which carries the master wheel along with the typewriter carriage at the moment of being disconnected therefrom. Figs. 27 to 35 inclusive, are side views of the numeral keys of the typewriter and the connections from them to the variable escapement mechanism; the views being taken at the bottom of a key depression. Fig. 36 is a side view similar to Fig. 14, but showing a key depressed and with more parts broken away to show more the connections between the keys and the computing mechanism.

Figs. 1, 16 to 20 inclusive, are about half-size; Figs. 14 and 15 are approximately full size, and the other views are on an enlarged scale.

Similar letters and figures refer to similar parts throughout the several views.

The computing register may, for purposes of illustration and description, be said to be divided into two divisions, as follows: first, the register proper which performs the actual work of calculation and displays the result to the eye of the operator at every stage of the process; and, second, the intermediate, operating mechanism which is interposed between the parts of the typewriter whose movements are controlled by actuating the keys thereof and the parts of the register, whereby the latter is made to produce results in exact accordance with, and consequent upon the action of the former. The several members of the typewriter shown and described in connection with my invention, are designated by letters, while numerals are employed to indicate the various parts of the register and intermediate mechanism, and in connection with the direction indicating arrows.

As hereinbefore stated my computing register is so constructed that it can be applied to any standard typewriter. Therefore in the accompanying drawings I have merely illustrated, more or less conventionally, the general construction of one style of typewriter in common use, in which the platen is moved step by step as the desired keys are successively operated.

The register proper is inclosed in the cylindrical case 1 which is securely fastened to the right-hand upright of the type-writer frame A (Fig. 1), by means of the bracket 2. The case 1 is suspended by its bracket between the rear keys of the type-writer, and the vertical front of the frame thereof, at the right of the center of the machine, and entirely remote from the movable parts of the same. Centrally located within the case 1 (Figs. 2 to 7) are the six indicator-bands or rings 3, $3^a$, $3^b$, $3^c$, $3^d$, and $3^e$ representing, respectively, units, tens, hundreds, thousands, tens of thousands, and hundreds of thousands. Each of the rings 3, $3^a$, etc., is provided on its periphery with the units from 1 to 9 inclusive, and the 0, in large characters for addition and in small characters for subtraction, and said computing wheels or rings are retained against lateral movement by the internal annular flanges 8 8 at each side of the series or rings, but the latter are permitted to revolve within the chamber thus provided for their reception. The sight-slot or opening 14 is cut in the top of the case 1, above the series of rings 3, $3^a$, etc., of sufficient size to permit one large and one small figure on each of said rings to be seen, when they are at rest; the construction being such that the uppermost figures thereon always line up beneath said opening except during the time of revolution of the revoluble members. The rings $3^a$ to $3^e$, inclusive, are provided with inwardly-projecting teeth 20 which form internal gears adapted to mesh with tens-carrying or carry-over pinions 21 on the shaft 22, when required to do so. Each of the rings 3 to $3^d$ inclusive, is provided with the left-hand, annular flange 23 which fits into the contiguous ring, the flange on the ring 3ᵈ being received by the ring 3ᵉ, that of the ring 3ᶜ being received by the ring 3ᵈ, etc.; each flange having a two-toothed starting segment 23ᵃ extending from the left side face thereof (Fig. 4). The space between the two teeth that make up each of the segments 23ᵃ, is continued into the integral flange 23, and said segment is also adapted to mesh with or engage one of the pinions 21 once in every revolution of the ring which it is on. The segment 23ᵃ on each of the rings specified, like the flange 23, fits into the contiguous ring and turns therein, at the right of the teeth 20 contained in said contiguous ring. The pitch of the segment teeth and of the teeth 20 is the same. Every other tooth on each pinion 21 is wider than the following or preceding one, and the adjacent flange 23 rides on two of the wide teeth when said pinion is elevated, forming a lock to prevent the same from turning except when the narrow tooth between two previously mentioned, is engaged by the outwardly projecting segment 23ᵃ at which time the pinion makes a partial revolution the dip in the locking flange 23 forming a continuation of the space between the two teeth of segment 23ᵃ, permitting this movement by accommodating the adjacent long tooth. These pinions and the serrated rings constitute a Geneva-stop movement which is so well understood as to require no further specific description here. This mechanism effects a carry-over or tens-carrying operation to transfer each complete revolution from each ring of lower denomination to the ring of next higher denomination. All of the rings 3, 3ᵃ, etc., are provided with the internal driving-teeth 24 located at the left of the teeth 20 in the various rings, except the ring 3 which does not require the latter teeth, but has the former. The teeth 24 number ten in each of said rings, and extend inward considerably nearer the center than do the teeth 20.

The flanges 8 8 practically divide the case 1 into three compartments or sections, the middle one being constantly occupied by the rings 3, 3ᵃ, etc., while the pinion-block 25 and the locking-plug 26 are reciprocated in the left- and right-hand sections respectively. The block 25 and the plug 26 are prevented from turning in the case 1, by means of the splines 27 and 28 which respectively engage suitable grooves in the opposite, enlarged ends of said block and plug. The block 25 is chambered at 29 to receive the five pinions 21 and the operating mechanism for the rising and falling, pinion-carrying blade 30, and has the slot 31 extending through the bottom thereof for the accommodation of said blade. The blade 30 has the vertical arms 32 which carry the shaft 22 for the pinions 21, and the forwardly-extending lugs 33 slotted to receive the operating pin 34, while the sides of the bottom of said blade are indented or corrugated as shown at 35, for the purpose of alinement of the teeth 24 of the rings 3, 3ᵃ, etc., as hereinafter fully explained. The cross-bars 36 traverse the chamber 29 and have the upwardly-extending, V-shaped ears 37 directly beneath the pinions 21 for the purpose of alining the teeth of said pinions when the latter are lowered. The shaft 38 passes through suitable openings in the left-hand end of the case 1 and the head of the block 25, and is rigidly connected with the pin 34 by the rocker-arm 39. Outside of the case 1, the shaft 38, telescopes into the rock-shaft 40, and has the pin 41 operating through the slots 42 in said rock-shaft, whereby a rocking motion is imparted from the latter to said first mentioned shaft which nevertheless has an independent, longitudinal movement. The rock-shaft 40 is operated by means described under the head of intermediate mechanism.

The locking-plug 26 has the external rib 43 adapted to engage the teeth 24 of such of the rings 3, 3ᵃ, etc, as are contiguous thereto, and lock said rings in place. The shaft 44 enters the right-hand side of the case 1, passes through the head of the plug 26 and has its internal bearing in the right end 45 of the block 25, being secured in place by the disk 46. The annular driver or master wheel 47 is rigidly attached to the shaft 44 between the end 45 and the plug 26, and is provided with the tooth 48 adapted to engage any of the teeth 24. The collar 49 is fast to the shaft 44 at the right of, but contiguous with, the plug 26 and serves with the disk 46, to connect the several, laterally-movable members together, so that they always maintain the same relative position to each other regardless of their changing positions in the case 1. The rod 50 extends to the left from the head of the block 25, through an opening in the adjacent end of the case 1, and the spring 51 is interposed between the end of said case and the pin 52 in the outer end of said rod. The spring 51 has a tendency to force the rod 50 to the left and thereby normally retains the block 25 and connected parts at the extreme left-hand end of their travel, with the tooth 48 of the driver or master wheel 47, engaging the teeth 24 in the ring 3ᵉ, and the rib 43 of the plug 26, engaging the teeth 24 in the other rings. The shaft 44 telescopes into the left terminal of the shaft 53, outside of the case 1, by which the driver 47 is rotated, the pin 54 and slots 55 serving the same purpose in connection with said shafts, that a similar pin and slots do for the block shaft and its rock-shaft previously described. Motion is imparted to the shaft 53 from some suitable source of power, as the clock-movement which will be described in connection with the other intermediate mechanism, as well as the device which compels the block 25 and connected members to follow inversely the movement of the typewriter carriage.

I will now proceed to describe the intermediate, operating mechanism, and in connection therewith, refer briefly to such well-known parts of the type-writer as enter intimately into the construction and operation of my invention.

The rocker-arm 56 projects to the rear from the rock-shaft 40, and is connected by the rod 57 with the regulation universal or carriage-shift bar B which is always depressed by the ordinary key- and space-levers. The shaft 40 has its bearings in the case 1 and a projection from the frame A. It will now be seen that, every time the bar B is depressed, the shaft 40 is rocked and elevates the pinions 21 until their teeth mesh with the teeth 20 in as many of the rings 3$^a$ to 3$^d$, inclusive, as said pinions are capable of engaging at the time the depression takes place, and said pinion teeth are also brought into the paths of the adjacent segments 23$^a$, through the medium of the blade 30 and intervening parts. When the bar B returns to its normal position, upon the release of the pressure thereon, the blade 30 is lowered and withdraws the pinions 21 from the paths of the teeth 20 and the segments 23$^a$. forcing the lowest teeth of said pinions into contact with the ears 37 for the purpose of perfectly alining and locking said last mentioned teeth to insure accurate engagement the next time the pinions are raised, the friction between the parts being sufficient to retain them in the position fixed by said ears until again rotated by the rings 3, etc.

The horizontal rod 58 is securely fastened to the carriage C and extends to the right therefrom, over the top of the machine. The notches 58$^a$ are cut into the back side of the rod 58 at intervals corresponding with the graduations on the type-writer scale D or in other words at letter-space intervals. The angular arm 59 is pivoted at 60 to the top of the frame A and its downwardly extending, front end is arranged to bear against the head of the block rod 50. The sleeve 61 is adjustably mounted on the rod 58 and has the set-screw 62 adapted to register with any one of the notches 58$^a$ and secure said sleeve to said rod. The rear end of the arm 59 lies in the path of the tripping-lug 63 which is pivoted at 64 (Fig. 22) to the sleeve 61 and has the steps or shoulders 63$^a$, 63$^b$, and 63$^c$. The weight of the front, major portion of the lug 63 causes it to drop down with its lowest step 63$^c$ resting on the top of the frame A, except when the cam-plate 65 is encountered when said lug swings upward on its pivotal connection with the sleeve 61. The cam-plate 65 is attached to the top of the frame A, in front of the rod 58 and in the path of the tripping-lug shoulder 63$^d$, by screws or any other means which render the same adjustable relative to the adjustment of the sleeve 61 and in accordance with the results desired to be obtained. The supplemental cam-plate 66 is adjustably connected to the plate 65 by the screw 67 (Fig. 23), a slot being provided in said plate 66 for the accommodation of said screw the front end of which is threaded into said plate 65. The rear end of the arm 59 is turned upward to engage the highest step on the lug 63 when the latter is in its normal position. The set-screw 62 in the sleeve 61, and the notches 58$^a$ in the rod 58, enable said rod and the carriage C to be adjusted with reference to the arm 59 for the purpose of permitting the former to be returned to or started from any predetermined position, or to engage the register at any required point along the scale D, with said arm engaging the rod 50 while the latter is tensioned to the left end of its stroke. As an illustration of the idea sought to be conveyed in the last sentence, suppose a column of figures is to be written one or more numbers in which are in the hundreds of thousands, and it is desired to place said column on the paper so that the figures representing hunderds of thousands will occupy a position corresponding to the index-mark 50 on the type-writer scale D, it is only necessary to loosen the set-screw 62, move the sleeve 61 on the rod 58 until said set-screw registers with the notch 58$^a$ that corresponds with said index-mark, and tighten said screw. The particular notch 58$^a$ may be determined by placing suitable indications on the bar 58 adjacent said notches, or by moving the typewriter carriage until the pointer thereof is opposite the desired graduation on the typewriter scale and then adjusting the lever 59 and stop 63 in the manner heretofore described. Now, when the carriage C is actuated so that its attached pointer E registers with the mark 50, the shoulder 63$^a$ bears against the rear end of the arm 59 and the front end of said arm rests against the head of the rod 50 which is thrust out to its full extent by the spring 51. Every time the carriage C is actuated to the left one number or notch, from this location, the driver or master wheel 47 is moved to the right from one of the said indicator-rings to the next, through the medium of the arm 59 and connecting parts, and when said carriage is returned to its starting point, said driver goes back to its initial position within the ring 3$^e$, the lug 63 drawing away from said arm as soon as the said mark has been passed by the carriage pointer E. Thus is a simple means provided for operating the driver 47 from the carriage C, when it is desired to use the register so that the denominations of the numbers as computed will accord with the denominations as typewritten, and for disconnecting said driver from the said carriage after said register has performed its work; this last result being obtained by moving the sleeve 61 along the rod 58 to the right and taking the lug 63 out of the way of the arm 59.

The operation described in the last part of the previous paragraph, provides for numbers that have no decimal or other division marks between the figures composing the same, hence the cam-plates 65 and 66 are not required or employed, but are either detached from the machine altogether or moved to one side away from the lug 63. In order to be able to point off certain figures the cam-plates before mentioned are made use of in the following manner:—If the numbers to be written and computed comprise dollars and cents, $1721.12 for example, the sleeve 61 is first properly adjusted, then the cam-plate 65 is so disposed on the frame A relative to the lug 63, that the latter travels four points or places with the shoulder 63$^a$ in contact with the arm 59, before arriving at the first or lower elevation on said plate; consequently moving the driver 47 from the ring 3$^e$ to 3$^a$. The period for the decimal point is next struck and the carriage C actuated one place, but the gear 68 is locked at this time by the cut-out mechanism hereinafter described, so that the driver 47 remains immovably in engagement with the ring 3$^a$, because the plate 65 has caused the lug 63 to swing upward sufficiently for the shoulder 63$^a$ to clear the arm 59 leaving it stationary while said lug travels from said shoulder to the shoulder 63$^b$, the latter now being in readiness to engage said arm and move said driver into contact with the remaining ring 3. If necessary to write other matter after each number, the cam-plate 66 is so adjusted as to cause the lug 63 to ride onto the same after the last figure in said number has been written, and raise itself clear of the arm 59. Suppose that two divisions in a number are required, such as 1,721.12, the cam-plate 65 is so adjusted as to receive the lug 63 upon its lower elevation after the 1 has been written, and upon its higher elevation after the next three figures have been written, said lower elevation being of the right length to permit this. Thus the arm 59 is actuated by the shoulders 63$^a$, 63$^b$, and 63$^c$ in succession. A similar adjustment is possible for a point after the first three figures, thus 172,112. In the last two instances as well as in the first, the cam-plate 66 is employed and suitably adjusted when the nature of the work requires the carriage C to proceed after the number has been written, before being returned for a new line or number.

The case 69 is attached to the right side of the frame A and the right terminal of the driver shaft 53 has its bearings therein. The actuating and stop mechanism for the driver 47, forming a part of the intermediate mechanism, is contained in the case 69 and will next be described. The shaft 53 is driven by a simple clock-movement consisting of the gear 70 on the stud 71, and the intermeshing pinion 72 tight on said shaft, said gear being run by the spiral-spring 73, subject to a certain, peculiarly constructed escapement operated by any one of the figure-key levers F$^1$ to F$^0$, inclusive, and the carriage shift-bar B. The stud 71 is journaled in the diaphragm 74 at 74$^a$, and the right side of the case 69, projecting beyond the latter to receive a key for winding the spring 73, the clock-movement being provided with the spring actuated pawl 75 and the ratchet 76 at the left of the gear 70, to enable the same to be wound up. The driver or escapement gear 68 is fast on the shaft 53 and has 10 teeth on each side of its rim or flange. The sleeve 77 is splined on the shaft 53 at the right of the gear 68, so as to rotate with said shaft while having a longitudinal movement thereon. The driver-stop disk 78 is loosely mounted on the sleeve 77 and is provided with the following projections: The gear-engaging pin 79 from its left face, the stop-pin 80 from its right-face, the stop 81 from its periphery, the stop 81$^a$ from the left side of said periphery, and the stop 81$^b$ from the right side of said periphery. Assuming that the periphery of the disk 78 is divided into ten equal parts which correspond to the number of teeth on each side of the gear 68, as shown in Fig. 14, (no such delineations being required in practice, however), the stop 81$^b$ is located at 0, the stop 81 at 6, and the stop 81$^a$ at 3, for reasons presently to be given. The shifter 82 which is of a bell-crank lever form, is pivoted at 83 to the lugs 83$^a$ extending from the left side of the case 69, and has its lower terminal attached to the shift-bar B. The upper end of the shifter 82 is bifurcated and the rear bifurcation or arm 82$^a$ extends around the gear 68 and normally engages one of the left-hand teeth thereon, while the front arm 82$^b$ enters the groove 77$^a$ in the sleeve 77. It will now be seen that, every time the bar B is depressed, the shifter arms 82$^a$ and 82$^b$ swing to the left, the first of said arms releasing the gear 68 and the second one actuating the sleeve 77 and the disk 78 until the pin 79 engages the teeth on the right-hand side of said gear. If the gear 68 is free to revolve at this time, the clock-spring 73 immediately causes it to do so, and the disk 78 is carried around with said gear in the direction of the arrow 84, Fig. 14, until checked by some force superior to said spring.

Since the driver or master wheel 47 is rigid with the same shaft as the gear 68, it follows that said driver will turn as far as said gear; for instance, if the disk 78 is checked after the gear has moved the distance of two teeth, the driver moves a like distance and turns its engaging indicator-ring or computing wheel the distance of two of its teeth 24. These movements are quite rapid and take place upon the depression of the bar B, as stated, and when said bar returns to its normal position, the shifter 82 causes the disk 78 and the gear 68 to be disconnected and the arm 82$^a$ reëngages said gear, thereby locking the same against the action of the clock-movement. The rear end of the extension 85 from the front side of the case 69, lies in the path of the stop-pin 80 and the spring 86 having one end fastened to said extension and the other to the disk 78, serves to retain the latter in its normal position with said pin bearing against the extension and the stop 81$^b$ adjacent to the stop-finger 0$^g$. When engaged and operated by the gear 68, the disk 78 is actuated against the resiliency of the spring 86 which is weaker than the clock-spring 73, but the instant these two members are disengaged said spring 86 returns said disk to its normal position.

The ten rock shafts 1$^f$, 2$^f$, etc., to 0$^f$, inclusive, have their bearings in opposite sides of the frame A and in the case 69, three of said shafts being below the horizontal plane of the other seven for the purpose of economizing space, and all are below the action of said key-and space-levers. The rock shafts 1$^f$, etc., may have their bearings in the case 69 and a plate fastened to the opposite side of the frame A, thus extending beneath instead of through said frame, if desired, an arrangement that might facilitate placing my invention on an old machine. Each of the rock-shafts 1$^f$, 2$^f$, etc., is provided with a rearwardly extending rocker-arm 87, on its right-hand end, and with a forwardly extending rocker-arm 88, intermediate of its ends. Each of the rocker-arms 88 is pivotally connected with its proper figure-key lever F$^1$, F$^2$, etc., by means of a link mechanism consisting of the strap 89 around said lever, the cylinder 90 pivoted at the base to the rocker-arm, and the plunger 91 pivoted at the top to said strap, with its lower terminal extending into said cylinder. This link mechanism provides for a variation in the upward stroke of the key-levers, but insures a positive and substantially even movement of the rock-shafts 1$^f$, etc., when said levers are depressed, the plungers 91 always arriving at the bottom of the openings in the cylinders 90 in time to impart said movement upon the down stroke of the levers. Each rock-shaft 1$^f$, etc., is provided at its left end with the spiral-spring 100 for returning said shaft to its normal position, after being actuated by its respective figure-key lever F$^1$, etc. The spring 100 is wound around its rock-shaft, with one end fastened thereto and the other to the frame A. When one of the shafts 1$^f$, etc., is returned by its spring 100, the bottom of the opening in the attached cylinder 90 may or may not come in contact with the base of the plunger 91 that operates therein; this depending upon the position of the coacting figure-key lever, as before intimated, but said plunger is always in connection with said cylinder, either actively or inactively. The levers F$^1$ to F$^0$, inclusive, respectively terminate in front in the upwardly-turned keys $f^1$ to $f^0$, inclusive, and, when one of these keys is depressed, it will be readily seen from the foregoing that the rocker-arm 87 on the corresponding rock-shaft 1$^f$, etc., is elevated. The stop-fingers 1$^g$, 2$^g$, 3$^g$, 4$^g$, 5$^g$, 6$^g$, 7$^g$, 8$^g$, 9$^g$, 0$^g$ are pivoted at their bases to the rear ends of the arms 87 on the shafts 1$^f$, 2$^f$, etc., respectively. The upper ends of the fingers 1$^g$, 2$^g$, etc. extend into suitable openings in the diaphragm 74 through which they operate, and, when normally disposed, said ends clear the arc of travel of the stops 81, 81$^a$, and 81$^b$.

The diaphragm 74 extends across the case 69, from front to back, beneath the disk 78. Said stop-fingers are so arranged as to group their upper ends in triplets side by side, with the exception of the finger 3$^g$ which stands alone; the first or front group comprising the fingers 2$^g$, 6$^g$, and 9$^g$; the second or middle group comprising the fingers 1$^g$, 5$^g$, and 8$^g$; and the third or rear group, the finger 0$^g$, 4$^g$, and 7$^g$; the fingers 2$^g$, 1$^g$, and 0$^g$ being placed behind the finger 3$^g$ in the order named; the fingers 6$^g$, 5$^g$, and 4$^g$ being next in line from front to back; and, lastly, the fingers 9$^g$, 8$^g$, and 7$^g$. When the disk 78 is in its normal position, the upper ends of the said stop-fingers are arranged around the lower portion of the periphery of said disk, as follows:—the end of the finger 3$^g$ adjacent to the division 3, Fig. 14, the ends of the front group adjacent to the division 2, those of the middle group adjacent to the division 1, and those of the rear group adjacent to the division 0. Thus three-tenths of the periphery of the disk 78 are always over the said stop-fingers and, by this compact and convenient arrangement of said fingers, I am able to check said disk and with it the gear 68, at a point representing or corresponding with any tooth on said gear, by throwing up the requisite finger into the path of its engaging stop. To illustrate the operation of the said stop-fingers, suppose the type-writer key $f^5$ for Fig. 5, be depressed, its lever $F^5$ rocks the shaft $5^t$ and throws up the middle finger $5^g$ of the middle group, into the path of the middle stop 81, the latter having been actuated to the left with the disk 78, at the time said key was depressed, by the bar B and the shifter 82. The disk 78 now turns five points in the direction of the arrow 84 in Fig. 14, or the distance of five teeth on the gear 68, when the stop 81 encounters the finger $5^g$ and checks the revolution of the parts. When the pressure on the figure-key $f^5$ is removed, the bar B and the lever $F^5$ return to their former positions, thereby rocking the shifter 82 to the right and allowing the finger $5^g$ to be withdrawn through the medium of the associated spring 100. This movement of the shifter 82 relocks the gear 68 and moves the disk 78 to the right, the spring 86 returning said disk to its starting point. When the 0 key $f^0$ on the writing-machine is struck, the finger $0^g$ at once encounters the right-hand stop $81^b$ and prevents the disk 78 and gear 68 from turning. Examples in addition and subtraction as performed by the register, will be introduced in this specification at the proper place, for the purpose of amplifying the description of the operation of the several parts, individually and collectively, but more especially the latter.

An eleventh rock-shaft 92 is journaled either in the frame A or so as to pass underneath the same, and projects at both ends beyond said frame, the right-hand terminal of said shaft being in the case 69. The left and right ends of the shaft 92 are respectively provided with the rocker-arms 93 and 94 extending forward therefrom. The cut-out finger 95 is pivoted at its lower end to the rocker-arm 94, passes through the guide 96 extending from the left side of the case 69, and normally engages the left-hand teeth on the gear 68 for the purpose of locking the same against the action of the clock-movement. The finger 95 is elevated into engagement with the gear 68 by means of the spiral spring 97 which is attached to the shaft 92 and the frame A in the same way that the springs 100 are connected with their rock-shafts and said frame. The front end of the arm 93 supports the cut-out key 98 by which the finger 95 is withdrawn from contact with the gear 68. The screw 99 is inserted in the frame A, with its rounded head projecting slightly into the lower end of the path of the arm 93. The use and operation of the cut-out device just described, is set forth below. While the finger 95 locks the gear 68, the rotation of the driver 47 is prevented and the type-writer can be employed for ordinary purposes, provided the carriage connection is disconnected as previously explained. But, when it is required to introduce numbers for computation into the matter being written, or, to state it more correctly, introduce words before or after said numbers, or both, it is necessary to depress the key 98 sufficiently to release the gear 68 from the finger 95, before proceeding to write the figures comprised in each of said numbers. The key 98, at such a time, is depressed by the thumb or a finger of the left hand, until the arm 93 strikes the screw 99 and, after the last figure of each number has been written, the key having been held down meanwhile, pressure is released, thus permitting the spring 97 to rock the shaft 92 and relock the gear 68. When it is desired to write the numbers without any accompanying words, however, the key 98 may be depressed with sufficient force to frictionally engage the arm 93 with the screw 99, which holds the parts against the resiliency of the spring 97. This gives the operator the use of both hands with which to manipulate the figure-keys. At the completion of the computation, the arm 93 is raised clear of the screw 99 and the spring 97 again causes the finger 95 to be thrust into the gear 68. It will be understood, of course, that the spring 97 and the screw 99 instead of being attached directly to the frame A, may be fastened to a plate which is in turn secured to said frame. This construction is preferable when the rock-shaft 92 is journaled beneath the frame A, as in the case of an old machine.

Before proceeding with a description of the general operation of the computing register, I wish to call attention to the fact that more or less than six indicator-rings may be employed with their coacting mechanism changed accordingly, without in any sense violating the spirit of my invention. Furthermore I wish to state that my register can be used for subtraction as well as for addition to adapt the mechanism for subtraction I provide a second series of figures on the peripheries of the indicator-rings, in a certain arbitrary manner. This second series is distinguished from the first in any suitable manner, in this case being composed of figures that are considerably smaller than the others, and each figure in said second series consists of a digit which, if subtracted from nine, will leave the neighboring large figure in the first series. The complete arrangement of the two series of ring figures is as follows:—The small 9 alternates with the large 0; the small 8, with the large 1; small 7, with large 2; 6 with 3; 5, with 4; 4, with 5; 3, with 6; 2, with 7; 1, with 8; and 0, with 9. The presence and arrangement of the figures on the indicator-rings noted above, serve as a substitute for mechanism that would otherwise be required to reverse certain of the movements of the register in order to utilize the same for the process of subtraction, and said figures therefore constitute a valuable factor in my improvement.

The following concrete example illustrating the process of adding and subtracting is submitted to insure a better and clearer understanding of the general operation of the register. X. bought two bills of goods from Y., the first amounting to $7,975.00, and the second, to $478.50, upon which he has paid the following amounts—$6,751.25, $79.00, and $629.75. It is now desired to find the total amount of the bills and the balance due. A statement embodying the above, appears below, and it will be noticed from the appended explanation thereof that the different items to be subtracted do not require to be added separately, the two processes being automatically performed at the same time and together.

| | | |
|---|---|---|
| To merchandise, | | $7975.00 |
| " " | | 478.50 |
| Total, | | 8453.50 |
| Recd. on acc. | | 6751.25 |
| " " " | | 79.00 |
| " " " | | 629.75 |
| Bal. due, | | 993.50 |

In writing and computing the above, the operator first sets the sleeve 61 so as to permit the paper in the carriage C to receive the first 7 far enough away from its right-hand edge, for the other figures in the number to be written thereafter. The cam-plate 65 is next adjusted for the decimal point. The carriage C is now actuated to the right as far as necessary for commencing the first line, and the two words contained therein are written; after which the dollar sign is printed in the proper place, the key 98 is depressed to unlock the gear 68 leaving the same held only by the shifter arm 82$^a$, and the several coacting members are in readiness to commence the operation of addition. But under usual conditions the master wheel or driver 47 will be held by the spring 51 in its extreme left-hand position clear of all of the rings or computing wheels 3, 3$^a$, etc. These computing or dial wheels 3, 3$^a$, etc., will all be so positioned that a line of "0's" will be exposed through the sight opening 14. As the typewriter carriage C comes to such a position that the initial digit column on the work-sheet, that is, the thousands digit column, is at the printing point of the typewriter, then the master wheel or driver 47 will, through the lug 63, the lever 59, and the shaft 50, be positioned in register with the initial computing wheel or ring 3$^e$, that is, the computing ring of highest denomination or the thousands computing wheel. Any desired letter space of the work-sheet can be brought into register with any computing wheel by using the lug 63, as a stop after positioning the carriage C, by adjusting the lug 63 and allowing the lever 59 to move under the tension of the spring 51 until it has come into engagement with the stop 63, bringing the master wheel 47 into register with the desired computing wheel. The depression of the 7 key $f^7$ for the first figure in the first number, not only writes or prints that character on the paper in the proper position, but, through the medium of intermeshing mechanism hereinbefore fully described, causes the shifter 82 to release the gear 68 and connect the disk 78 with said gear, while at the same time throwing up the stop-finger 7$^g$ into the path of the stop 81$^a$ which, with said disk, is checked thereby after the latter has turned seven points. Synchronously with these performances and as a result of the same act, the pinions 21 and the blade 30 are elevated.

The rotation of the gear 68, by the clock-movement, until stopped at the seventh tooth as previously indicated, has caused the driver 47 to turn the ring 3$^e$ a like number of teeth 24 and expose the large figure 7 at the opening 14, instead of the cipher. It will be well to state here that the large 0 on each of the said indicator-rings, should be located beneath the opening 14 in the case 1, at the commencement of an example in either addition or subtraction; if they do not so appear, the proper type-writer keys must be manipulated until they conform to the order required. The proper arrangement of the said rings would better be attended to immediately after the completion of an example, but may be done just prior to commencing a new example, of course. To resume the explanation interrupted above: the release of pressure on the 7 key $f^7$ enables the carriage C to move one place or step to the left and carry with it the rear end of the arm 59; thereby actuating the block 25 and the plug 26 to the right, the driver 47 passing from the ring 3$^e$ to the ring 3$^d$. At the same time the blade 30 descends with the pinions 21, the former engaging the teeth 24 of the ring 3$^e$ and locking the same, the shifter 82 having, meanwhile, reëngaged the gear 68 and permitted the disk 78 to resume its normal position, and the finger 7$^g$ returned to its former place. The depression and elevation of the 9 key $f^9$ results in substantially the same movements as the depression of the 7 key $f^7$, with the exception of throwing up the stop-finger 9$^g$ in place of 7$^g$, by means of which the ring 3$^d$ exposes 9 at the opening 14, and the driver 47 moves to the ring 3$^c$, leaving the first mentioned ring to be locked by the blade 30, with the ring 3$^e$. The 7 key $f^7$ and the 5 key $f^5$ are next struck respectively, which bring 7 and 5 on the rings 3$^c$ and 3$^b$ below the opening 14, leaving the driver within the ring $3^a$. As the blade 30 moves to the right with the block 25, the indentations 35 enable said blade to perfectly aline the teeth 24 in contiguous indicator-rings as well as to lock the same after being set by the driver 47. Owing to the presence of the cam-plate 65, the tripping-lug 63 operates in the manner already explained, to provide for inertia on the part of the driver 47 while the decimal point is printed. The two ciphers are then written, the stop-finger $0^g$ preventing any rotation of the disk 78 and the gear 68, thus leaving the rings $3^a$ and 3 undisturbed. The plug 26 is now clear of the last ring 3 which is still engaged by the driver 47, however, the latter being at the end of its travel to the right. Since the right end of the plug 26 is in contact with the corresponding end of the case 1, further movement of the carriage C to the left is checked by this contact and the latter must be returned to the starting point. The return of the carriage C permits the spring 51 to draw the block 25 with the blade 30, out of the indicator-rings $3^a$, $3^b$, etc., and the plug 26 with the driver 47 into the same, in readiness for the next step in the process, the cut-out finger 95 having first been introduced between the teeth of the gear 68, by releasing the key 98. The rings 3, $3^a$, etc. remain in the several positions allotted to them by the driver 47, being held there by the plug 26 and said driver. It will be noticed that the pinions 21 have as yet had no occasion to perform any work.

The second line is next written and the cut-out key 98 is not depressed until the driver 47 is within the ring $3^d$, said driver being thus located by the action of the carriage C which is operated by the space-bar G, when the 4 key $f^4$ is struck, resulting in turning the ring $3^d$, four points in addition to the nine points previously covered, and exposing a 3 at the case opening, while the right-hand pinion 21 is rotated by the flange teeth or segment $23^a$ belonging to said ring, sufficiently to move the ring $3^e$ one point or tooth 24 and change the exposed 7 to 8. The writing of the 7 moves the ring $3^c$ a like number of teeth 24 in addition to the seven previously turned and exposes a 4, while causing the first pinion 21 to change the 3 on the ring $3^d$ to 4. The 8 key $f^8$ gives a 3 on the ring $3^b$, and 5 on the ring $3^c$. The 5 and 0 keys $f^5$ and $f^0$ give the same characters at the opening 14. The number composed of the figures 845350, which shows through the case opening is the answer sought and is written below the line in the proper place. It is obvious that a column of figures representing any amount within the capacity of the register can be as readily and accurately added as the two numbers herein employed for an illustration.

From the result above obtained, certain amounts are to be subtracted, in order to do which, with my device, it becomes necessary to strike the type-writer keys representing the complements of the figures comprised in said result, or the small figures on the indicator-rings associated therewith, but this is not done until said rings have been rearranged in the manner next to be described. After inserting a slip of paper between the paper on the carriage C and the ribbon of the machine to avoid interfering with the work thereon, actuate said carriage until the lug 63 is in position to operate the arm 59, and strike the proper figure-keys $f^1$, etc., for causing the several indicator-rings to complete the revolution last begun, which brings the larger cipher and the small nine into view. The keys required to be struck in this case are as follows:—$f^2$, $f^6$, $f^5$, $f^7$, and $f^5$, the ring 3 being left undisturbed as it already occupies the initial position. Next strike the alternates of 845350, or 154649 which immediately appear as the large characters at the opening 14, and withdraw the slip of paper previously mentioned. The mechanism is now in readiness to proceed in precisely the same way as for addition. The large figures 154649 change to 829774 when 675125 are added thereto, which in turn change to 837674 after the 7900 have been written, and finally the addition of 62975 produces 900649 at the opening 14, in large figures, the small figures or complements of which, 99350 being the correct result of the subtraction. This last number is written in its place, the operator reading from the register, and the process is completed. Nothing now remains to do, but rotate the rings 3, $3^a$, etc. to their initial positions, cut out the driving gear 68, and if the register is not to be used again before the writing machine is wanted for other purposes, remove the sleeve 61 to the right-hand end of the rod 58, or otherwise readjust the former on the latter as occasion may require.

The cipher stop-finger $0^g$, with the connections between it and the figure-key lever $F^0$, may be omitted from the construction of my device, if desired, and the cut-out finger 95 permitted to act as a substitute therefor. In the absence of the cipher stop-finger the cut-out finger 95 is utilized to prevent the driver 47 from turning whenever the cipher-key is struck.

It will be understood that the invention may be embodied or used with typewriting machines of various forms and therefore it is not deemed necessary to completely illustrate or describe in detail any particular typewriting machine. As usual the one illustrated includes both letter and figure type, and keys for actuating said type and bearing characters corresponding to the type with which they are connected, In my Patent No. 763,966, I have shown a computing device having incorporated therein some of the features of the present invention.

Having thus described my invention, I claim:

1. The combination with a typewriting machine having keys, and means actuated by the keys for printing letters and figures, of a computing attachment comprising a driver, a motor for the driver controlled by the figure keys of the typewriter, and a locking device for locking the motor out of action at the will of the operator.

2. The combination with a typewriting machine having a platen movable step by step, and keys and connections for printing letters and figures, of a computing attachment having certain parts movable step by step corresponding with the platen movements, and means for automatically suspending and renewing said step by step movement of said parts at one or more points of the movement of the platen.

3. In a computing register for typewriters, in combination with the figure-keys of the writing machine and a driver for said register, a rotary stop-disk connected with said driver, and a series of figure-key-actuated stop-fingers adapted to limit the rotary motion of said disk, for the purpose set forth.

4. In a typewriter, the combination with the figure keys, of a motor actuated computing mechanism, an escapement therefor, and a plurality of rock shafts connected respectively with the figure keys and adapted to control the movements of the escapement of said adding mechanism.

5. In a typewriter provided with a computing mechanism, the combination with a series of letter and figure types, keys having connections for actuating said types, a carriage, and mechanism controlled by each of said keys for moving the carriage letter-space distances, of a computing mechanism including a plurality of indicators, a driver for the indicators, means controlled by the figure keys for moving the driver figure-value distances, means for effecting a relative denominational movement between the driver and indicators, and locking means for positively preventing displacement of the indicators and including a pinion that is moved from operative position when establishing operative connection between the indicator controlled by said pinion and the driver.

6. In a typewriter provided with a computing mechanism, the combination with a series of letter and figure types, keys having connections for actuating said types, a carriage, and mechanism controlled by each of said keys for moving the carriage letter-space distances, of a computing mechanism including a plurality of indicators, a driver for said indicators, means controlled by the figure keys for moving the driver figure-value distances, means for effecting a relative denominational movement between the driver and indicators, locking means acting to positively prevent rotation of all the indicators, carrying devices for transmitting movement from each indicator to the indicator of next highest denomination, and means to release said indicator from the locking means during the driving and carrying operation.

7. The combination with a typewriting machine having a platen movable step by step, and keys and connections for printing letters and figures, of a computing attachment comprising a series of internally toothed indicator rings, carrying devices arranged within said rings, a rotatable driver arranged within and adapted to mesh with either of said rings, and means controlled by the figure keys of the typewriter for rotating the driver and the indicator ring in engagement therewith and for shifting said driver from one to another of said rings after such rotation.

8. The combination with a typewriting machine having a platen movable step by step, and keys and connections for printing letters and figures, of a computing attachment comprising a series of internally-toothed indicator rings, carrying devices arranged within said rings, a driver arranged within said rings, connections between said driver and the typewriter carriage for imparting to the driver a step by step movement from order to order, and means for rotating the driver in response to the movement of the figure keys of the typewriter.

9. The combination with a typewriting machine having a platen movable step by step, and keys and connections for printing letters and figures, of a computing attachment comprising a fixed casing, a series of internally-toothed indicator rings rotatably mounted in said casing, a driver arranged within said rings and shiftable step by step from order to order, means for locking the rings which are not in engagement with the driver, and means for releasing the rings at the left of the driver when the driver is operated.

10. The combination with a typewriting machine having a platen movable step by step, and keys and connections for printing letters and figures, of a computing attachment comprising a series of internally-toothed indicator rings, a series of carrying pinions within said rings and movable radially into and out of engagement therewith, a driver within said rings, and means for imparting a step by step movement to the carrier pinions and driver. simultaneously with the movement of the typewriter carriage.

11. The combination with a typewriting machine having a platen movable step by step, and keys and connections for printing letters and figures, of a computing attachment comprising a part having a step by step movement, connections between the typewriter carriage and the computing attachment for imparting said movement, and means for interrupting the step by step movement of said part of the computing device during certain movements of the typewriter carriage, whereby punctuation marks or spaces may be supplied between printed figures.

12. The combination with a typewriting machine having a platen movable step by step, and keys and connections for printing letters and figures, of a computing attachment comprising a part having a step by step movement, means comprising an arm connecting said part with the typewriter carriage, and devices included in said connecting means whereby said carriage moves independently of said arm, whereby punctuation marks or spaces may be supplied between printed figures.

13. The combination with a typewriting machine having a platen movable step by step, and keys and connections for printing letters and figures, of a computing attachment, a connection between the typewriter carriage and a part of said computing attachment for imparting a step by step movement to said part, and means for rendering said connections inoperative at certain intervals of the typewriter carriage movement comprising the lug 63 having shoulders thereon, and the cam plates for raising said lug to cause successive shoulders to coöperate with the connection to the computing device.

14. The combination with a typewriting machine having a platen movable step by step, and keys and connections for printing letters and figures, of a computing attachment comprising a single series of indicator rings, a master member therefor, a connection between said master member and said platen, and means for automatically interrupting and renewing the connection to cause the computing attachment to coöperate with different parts of the platen, whereby figures written at different parts of the platen may be computed.

15. In a computing register for a typewriter, in combination with the figure keys of the writing machine, a series of coaxial indicator rings having internal teeth, means for rotating one or more of said rings simultaneously with the action of any one of said keys, and means within the rings for alining and locking said rings before and after turning.

16. In a computing register for typewriters, in combination with the figure-keys of the writing machine, a series of coaxial indicator-rings representing units, tens, hundreds, etc., means within the rings for revolving any one of said rings independently, simultaneously with the action of any one of said keys, and means within the rings for turning, for a fractional part of a revolution, one or more rings of a higher denomination, from one previously moved.

17. In a computing register for typewriters, in combination with a series of coaxial revoluble indicator-rings, a locking plug adapted to engage and hold one or more of said rings from turning, and means for reciprocating said plug coincidently with the action of the typewriter carriage.

18. In a computing register for typewriters, in combination with a series of coaxial revoluble indicator-rings, having internal teeth, a vertically and horizontally-reciprocating locking and alining blade arranged within said rings.

19. In a computing register for typewriters, the combination with the carriage and figure keys of a typewriter, of a series of coaxial revoluble indicator-rings having teeth, a locking and alining blade adapted to intermittently engage said teeth, means for longitudinally reciprocating said blade coincidently with the action of the typewriter carriage, and means for vertically reciprocating said blade coincidently with the action of any one of the figure-keys.

20. In a computing register for typewriters, the combination with the carriage and figure keys of a typewriter, of a series of coaxial revoluble indicator-rings having teeth, a locking and alining blade adapted to intermittently engage certain of said teeth, pinions on said blade adapted to intermittently engage certain others of said teeth, means for longitudinally reciprocating said blade and pinions coincidently with the action of the typewriter carriage, and means for vertically reciprocating said blade and pinions coincidently with the action of any one of the figure keys.

21. In a computing register for typewriters, the combination with the carriage and figure keys of a typewriter, of a series of coaxial indicator rings having internal teeth, carrying devices arranged within said rings, a driver operating within said rings, means for actuating said driver coincidently with the action of the typewriter carriage, to engage the same with any one of said rings, and means for rotating said driver and engaged ring coincidently with the action of any one of the figure keys.

22. In a computing register for typewriters, in combination with a series of coaxial indicator rings having teeth, a rotary driver capable of being actuated into engagement with certain of the teeth of any one of said rings and turning the same, and a series of vertically and horizontally reciprocating pinions arranged to engage certain others of said teeth and impart motion to one or more of the inactive rings, from the ring turned by said driver.

23. In a computing register for typewriters, the combination with the carriage and figure keys of the typewriter, of a series of coaxial indicator rings having teeth, a driver capable of engaging certain of said teeth, a series of pinions capable of engaging certain others of said teeth, means for actuating said driver and pinions coincidently with the action of the typewriter carriage, and means for rotating said driver and engaged ring and elevating said pinions coincidently with the action of any one of said figure keys, whereby motion is imparted to one or more of the inactive rings, from the one turned by said driver.

24. In a computing register for a typewriter, the combination with the carriage and figure keys of the typewriter, of a series of coaxial indicator rings, a driver, a locking device, said driver and device both adapted to engage said rings, means for simultaneously reciprocating the driver and plug coincidently with the action of the typewriter carriage, and means for rotating the driver coincidently with the action of any one of said figure keys.

25. In a computing register for typewriters, the combination with the carriage and figure keys of the typewriter, of a series of coaxial indicator rings, a driver, a blade, both driver and blade being adapted to engage said rings, means for simultaneously reciprocating the driver and blade coincidently with the action of the typewriter carriage and means for rotating the driver coincidently with the action of any one of the said figure keys.

26. In a computing register for typewriters, the combination with the carriage and the figure keys of the typewriter, of a series of coaxial indicator rings, a driver, a plug, a blade, means for simultaneously actuating said three last mentioned members coincidentally with the action of the typewriter carriage, whereby the driver engages one or another of said rings, the others being locked and alined by said plug and blade, and means for releasing the rings at the left of the driver and for rotating said driver and engaged ring coincidently with the action of any one of the figure keys.

27. In a computing register for typewriters, the combination with the figure keys of a typewriter, of a series of internally toothed indicator rings, a series of carrying pinions arranged within and adapted to intermittently engage the teeth of the indicator rings, and connections between said typewriter keys and pinions, whereby the action of any of the former is communicated to the latter.

28. In a computing register for typewriters, the combination with the figure keys of a typewriter, of a series of internally toothed indicator rings, an alining and locking blade arranged within and adapted to engage one or more of said toothed indicator rings, and connections between said keys and blade whereby the action of any of the former is communicated to the latter.

29. In a computing register for typewriters, the combination with the figure keys of a typewriter, of a series of internally toothed indicator rings, an alining and locking blade provided with a series of pinions, said blade and pinions being adapted to intermittently engage one or more of said indicator rings, and connections between said keys and the blade and pinions, whereby the action of any of the keys is communicated to the blade and pinions.

30. The combination with a typewriting machine having a platen movable step by step, keys, and means controlled by the keys for printing letters and figures, of a computing attachment comprising a series of indicator rings having internal teeth, a driver movable within said rings, carrying pinions movable within said rings, and means controlled by the typewriter carriage for effecting a relative movement between the indicator rings and the driver and carrying pinions.

31. In a computing register, in combination with the carriage of a typewriter, and with a series of indicator rings, devices coöperating with said rings comprising a driver, a series of pinions, a plug, an alining and locking blade, and intermediate mechanism between said carriage and said devices whereby the latter are reciprocated in correspondence with the movement of the former.

32. A computing machine combining a typewriter carriage, a register provided with a longitudinally-movable member, an arm connected to said member, a stepped tripping-lug connected with said carriage, and a cam-plate device in the path of said lug to control the connection between said carriage and said arm.

33. The combination of a typewriting machine, a computing mechanism, a rotatable driver for said computing mechanism, a source of power for rotating said driver, a series of stops rotatable with said driver, and means operated by the figure keys of the typewriting machine for engaging one of said stops, thereby checking said driver in accordance with the particular key actuated.

34. In a computing register for typewriters, the combination with the figure-keys of the writing machine, of stop mechanism consisting of a rotary disk, and a series of figure-key-actuated fingers grouped below the same, said fingers being arranged and adapted to check the revolution of said disk at certain fixed points.

35. In a typewriter, the combination with the figure-keys, of a motor actuated computing mechanism, an escapement therefor, a plurality of rock shafts connected respectively with the figure keys, and a series of longitudinally movable stops movable by said shafts into the path of the escapement of said adding mechanism.

36. In a typewriter provided with a computing register, the combination with a series of letters and figure types and keys therefor, of a rotary driver for the register, a plurality of stops for controlling the movements of said driver, and a plurality of rock shafts, each shaft having two radially projecting arms, one connected with one of the figure keys and the other adapted to operate one of said stops.

37. In a typewriter provided with a computing register, the combination of a series of letter and figure types and keys therefor, carriage feed mechanism adapted to be actuated by each of said keys, a source of power, an operating member driven thereby, a series of adding wheels driven by said member, means for positively locking against rotation all of the adding wheels except those which are being actuated by said member, and means connected with the figure keys for controlling the operation of said wheels.

38. In a typewriter provided with a computing mechanism, the combination with a series of letter and figure types and keys with connections to said types, a carriage, and mechanism for actuating the carriage letter space distances under the control of each of said keys, of a computing mechanism including a member movable denominational and figure value distances upon the actuation of any of the figure keys, numbered indicators having carriers integral therewith, a gear for each indicator engaging the carriers thereof, and a driver directly engaging said indicators.

39. In a typewriter provided with a computing mechanism, the combination with a series of letter and figure types and keys with connections to said types, a carriage, and mechanism for actuating the carriage letter space distances under the control of each of said keys, of a computing mechanism including a member movable from denomination to denomination and for figure values upon the actuation of any of the figure keys, and comprising numbered indicators having carriers integral therewith, a gear for engaging the carrier of each indicator, means to produce a relative denominational step by step motion between said gears and indicators, and a driver for said indicators.

40. In a typewriter provided with a computing mechanism, the combination with a series of letter and figure types and keys with connections to said types, a carriage, and mechanism for actuating the carriage letter space distances under the control of each of said keys, of a computing mechanism including a member movable from denomination to denomination and for figure values upon the actuation of any of the figure keys, and comprising numbered indicators having carriers integral therewith, a gear for engaging the carrier of each indicator, means to give said gears a denominational step by step motion, and a driver for the indicators.

41. In a typewriter provided with a computing mechanism, the combination with a series of letter and figure types and keys with connections to said types, a carriage, and mechanism for actuating the carriage letter space distances under the control of each of said keys, of a computing mechanism including a member movable from denomination to denomination and for figure values upon the actuation of any of the figure keys, and comprising numbered indicators having carriers and locking devices integral therewith, a part for engaging said carrier and locking device of each indicator, and a driver for the indicators.

42. In a typewriter provided with a computing mechanism, the combination with a series of letter and figure types and keys with connections to said types, a carriage, and mechanism for actuating the carriage letter space distances under the control of each of said keys, of a computing mechanism including a member movable from denomination to denomination and for figure values upon the actuation of any of the figure keys, and comprising numbered indicators having carriers and locking devices integral therewith, a part for engaging said carrier and locking devices of each indicator, a driver for the indicators, and means to give said carrier engaging parts a denominational step by step motion.

43. In a typewriter provided with a computing mechanism, the combination with a series of letter and figure types and keys with connections to said types, a carriage, and mechanism for actuating the carriage letter space distances under the control of each of said keys, of a computing mechanism including a member movable a figure value distance by each of said figure keys, numbered indicators having carriers and locking devices integral therewith, a part for engaging said carriers and locking devices of each indicator, a driver, and means to cause a relative denominational movement between the driver and the indicators.

44. In a typewriter provided with a computing mechanism, the combination with a series of letter and figure types and keys with connections to said types, a carriage, and mechanism for actuating the carriage letter space distances under the control of each of said keys, of a computing mechanism including a member movable denominational and figure value distances upon the actuation of any of the figure keys, numbered indicators having carriers and locking devices integral therewith, a gear and stop for engaging said carriers and locking devices of each indicator, a driver, and means to cause a relative denominational movement between the driver and indicators and between the latter and said gears and stops.

45. In a typewriter provided with a computing mechanism, the combination with a series of letter and figure types and keys, connections to said types, a carriage, and mechanism controlled by each of said keys for moving the carriage letter space distances, of a computing mechanism including means adapted to be actuated denominational and figure value distances upon the actuation of any of said figure keys, numbered indicators, locking devices, a driver, means to lock all the indicators except the one driven, and carrying devices having means to unlock each indicator while it is being carried and relock the same instantly thereafter.

46. In a typewriter provided with a computing mechanism, the combination with a series of letter and figure types and keys, with connections to said types, a carriage, and mechanism controlled by each of said keys for shifting the carriage letter space distances, of a computing mechanism including means adapted to be actuated denominational and figure value distances under the control of each of the figure keys, numbered indicators, a driver, means to lock all the indicators except the one driven, carrying devices having means to unlock each indicator while it is being carried and relock the same instantly thereafter, and means to advance said locking and carrying devices from denomination to denomination, leaving the orders below the driver free therefrom.

47. In a combined typewriting and computing mechanism, the combination comprising a series of letter and figure types, keys with connections to said types, a series of indicators, teeth connected with said indicators, a series of positively operated locking and alining elements engaging said teeth and controlled in operation by said keys, a driver, mechanism operating under the control of said keys to move the typewriter carriage letter space distances and to produce a relative movement between said indicators and driver, and means under the control of the keys connected with the figure types to give the driver a figure value movement.

48. In a combined typewriting and computing mechanism, the combination comprising a series of letter and figure types, keys with connections for actuating said types, a series of indicators, teeth connected with the indicators, a series of positively operated locking and alining elements engaging said teeth, means controlled by the keys for moving the typewriter carriage letter space distances and producing a relative denominational movement between the indicators and said locking and alining elements and between the driver and the indicators in accordance with the movement of the typewriter carriage, and means under the control of the keys connected with the figure types for imparting to the driver figure value movements.

49. In a combined typewriting and computing mechanism, the combination comprising a series of letter and figure types, keys with connections to said types, a series of indicators, teeth connected with the indicators, a series of positively operated locking and alining elements engaging said teeth, a driver, a guideway for one of said computing elements extending parallel with the guideway of the typewriter carriage, a connecting arm between said carriage and the element of said computing mechanism movable along said guideway, means controlled by any of the keys for actuating the typewriter carriage letter space distances, and producing a relative movement for denominational distances between the indicators and said locking and alining elements and between the driver and indicators, and means under the control of the figure keys for moving the driver figure value distances.

50. In a combined typewriting and computing mechanism, the combination comprising a series of letter and figure types, keys with connections to said types, a driver, a series of indicators, teeth connected with said indicators, positively operated locking and alining elements for the indicators, a series of toothed wheels arranged to engage said teeth, means controlled by any of the keys for actuating the typewriting carriage letter space distances and producing a relative denominational movement between the indicators and said locking and alining elements and between the driver and the indicators in accordance with the movement of the typewriter carriage, and means under the control of the figure keys for moving the driver figure value distances.

51. In a combined typewriting and computing mechanism, the combination comprising a series of letter and figure types, keys with connections to said types, a series of indicators, teeth connected with said indicators, positively operated locking and alining elements for the indicators, a series of toothed wheels arranged to engage said teeth, means controlled by the keys for moving the typewriter carriage letter space distances and producing a relative denominational movement between the indicators and said toothed wheels and between the driver and the indicators, in accordance with the movement of the carriage, means under the control of the figure keys for moving the driver figure value distances, and means to disengage said toothed wheels from said teeth during each carriage movement.

52. In a combined typewriter and computing mechanism, the combination comprising a series of letter and figure types, keys with connections to said types, a carriage, means controlled by each of said keys for moving the carriage letter space distances, computing mechanism arranged over the keyboard of the typewriter and including a member movable figure value distances under the control of the figure keys, one of the members of the computing mechanism being movable denominationally, a guideway for said denominationally movable member of the computing mechanism parallel with the guideway of the carriage, and a lever fulcrumed on top of the typewriter frame and having one arm extending into the path of a member on the carriage and another arm arranged to move said denominationally moving member of the computing mechanism.

53. In a combined typewriter and computing mechanism, the combination with letter and figure types, keys connected to actuate the types, a carriage, and mechanism for shifting the carriage a letter space distance when any of the keys is actuated, of computing mechanism including two relatively movable members, a guide for the movable member extending parallel to the path of the typewriter carriage, means for moving said movable member on its guide as the carriage moves letter space distances including a device arranged in rear of the platen and adjustable relative to the carriage and a lever extending transversely of the platen and having an arm adapted to be actuated by said device and another arm connected with the said movable member of the computing mechanism, and means controlled by the figure keys for moving the members of the computing mechanism figure value distances.

54. In a combined typewriting and computing mechanism, the combination comprising a series of letter and figure types and keys with connections thereto, a series of indicators, a driver for said indicators, means operating under the control of any of the keys for shifting the typewriter carriage letter space distances and producing a relative movement between said driver and indicators, means actuated under the control of the figure keys for moving the driver figure value distances, and two sets of positive locking devices for preventing actuation of the indicators, one on each side of the driver.

55. In a combined typewriting and computing mechanism, the combination of means for printing letters and figures, including suitable keys, a carriage, mechanism for moving the carriage step by step on the actuation of any of said keys, a computing mechanism including an adjustable element, a guideway for said adjustable element, a lever having one member extending into the path of the typewriter carriage and another member adapted to shift the adjustable element of the computing mechanism as said lever is rocked by movement of the typewriter carriage, and means permitting a movement of the typewriter carriage, under the control of said keys, without actuating said lever at an intermediate point in the movement of the lever caused by the carriage.

56. In a combined typewriting and computing mechanism, the combination of means for printing letters and figures, including suitable keys, a carriage, mechanism for moving the carriage step by step on the actuation of any of said keys, a computing mechanism including an adjustable element, a guideway for said adjustable element, a lever fulcrumed at an intermediate point of its length and having one member extending into the path of the typewriter carriage and another member adapted to shift the adjustable element of the computing mechanism as said lever is rocked by movement of the typewriter carriage, and means for automatically disconnecting said lever from the typewriter carriage at a predetermined point in the travel of the latter.

57. In a combined typewriting and computing mechanism, the combination of means for printing letters and figures, including suitable keys, a carriage, mechanism for moving the carriage step by step on the actuation of any of said keys, a computing mechanism including an adjustable element, a guideway for said adjustable element, a lever having one member extending into the path of the typewriter carriage and another member adapted to shift the adjustable element of the computing mechanism as said lever is rocked by movement of the typewriter carriage, and means for disconnecting said lever from the carriage during a single movement of the carriage at a predetermined point in the travel of the latter.

58. In a typewriter provided with a computing mechanism, the combination with a series of letter and figure types, keys having connections for actuating said types, a carriage, and mechanism controlled by each of said keys for moving the carriage letter space distances, of a computing mechanism including a plurality of indicators, a driver for the indicators, means controlled by the figure keys for moving the driver figure value distances, means for effecting a relative denominational movement between the driver and indicators, locking means acting to positively prevent actuation of the indicators, carrying devices for transmitting movement from each indicator to the indicator of next highest denomination, and means to release the indicators representing higher denominations than that actuated by the driver from the locking means during the operation of the driver.

59. In a typewriter provided with a computing mechanism, the combination with a series of letter and figure types, keys having connections for actuating said types, a carriage, and mechanism controlled by each of said keys for moving the carriage letter space distances, of a computing mechanism including a plurality of indicators, a driver for the indicators, means controlled by the figure keys for moving the driver figure value distances, means for effecting a relative denominational movement between the driver and indicators, and means on opposite sides of the driver for positively preventing actuation of all the indicators except the one in the same denominational position as the driver.

60. In a typewriter provided with a computing mechanism, the combination with a series of letter and figure types, keys having connections for actuating said types, a carriage, and mechanism controlled by each of said keys for moving the carriage letter-space distances, of a computing mechanism including a plurality of indicators having propelling teeth connected therewith, a source of power, a driver for the indicators driven by said source of power, means controlled by the figure keys for moving the driver figure-value distances, means for effecting a relative denominational movement between the driver and indicators, and locking means acting to positively prevent movement of all the indicators.

61. In a typewriter provided with a computing mechanism, the combination with a series of letter and figure types, keys having connections for actuating said types, a carriage, and mechanism controlled by each of said keys for moving the carriage letter-space distance, of a computing mechanism including a plurality of indicators, a driver for the indicators, means controlled by the figure keys for moving the driver figure-value distances, means for effecting a relative denominational movement between the driver and indicators, and locking means for positively preventing actuation of the indicators, said means including pinions that are movable bodily to and from operative position.

62. In a typewriter provided with a computing mechanism, the combination with a series of letter and figure types, keys having connections for actuating said types, a carriage, and mechanism controlled by each of said keys for moving the carriage letter-space distances, of a computing mechanism including a plurality of indicators, a driver for the indicators, means controlled by the figure keys for moving the driver figure value distances, means for effecting a relative denominational movement between the driver and indicators, locking means for positively preventing actuation of the indicators and including pinions that are movable bodily to and from operative position, and means for engaging the pinions when in inoperative position to maintain the same stationary.

63. In a typewriter provided with a computing mechanism, the combination with a series of letter and figure types, keys having connections for actuating said types, a carriage, and mechanism controlled by each of said keys for moving the carriage letter-space distances, of a computing mechanism including a plurality of indicators, a driver for the indicators, means controlled by the figure keys for moving the driver figure-value distances, locking means extending in opposite directions from the driver and acting positively to prevent actuation of all the indicators except the one in the same denominational position as the driver, and means for effecting a relative denominational movement between the indicators and the driver and locking means whereby the connection between said means and the indicators is shifted from one side of the driver to the other.

64. In a typewriter provided with a computing mechanism, the combination with a series of letter and figure types, keys having connections for actuating said types, a carriage, and mechanism controlled by each of said keys for moving the carriage letter-space distances, of a computing mechanism including a plurality of indicators, a driver for the indicators, means controlled by the figure keys for moving the driver figure-value distances, means acting positively to prevent actuation of all of the indicators except the one in the same denominational position as the driver, said means including two sections, each adapted to control all of the indicators on the same side of the driver, and means for effecting a relative denominational movement between the indicators and the driver and locking means, whereby the initially inoperative section of the locking means is rendered operative and vice versa.

65. In a typewriter provided with a computing mechanism, the combination with letter and figure type, keys for actuating the type, a carriage, and means controlled by the operation of any of the keys for moving the carriage letter-space distances, of a computing mechanism including a plurality of indicators, a driver for the indicators, means controlled by the figure keys for moving the driver figure-value distances, means acting positively to prevent actuation of any of the indicators except that representing the lowest order, independent means for locking the last said indicator, means for effecting a relative denominational movement between the indicators and driver, and means for releasing said locking means when the driver is in operation.

66. In a typewriter provided with a computing mechanism, the combination with letter and figure type, keys for actuating the type, a carriage, and means controlled by the operation of any of the keys for moving the carriage letter-space distances, of a computing mechanism including a plurality of indicators, a driver for the indicators, means controlled by the figure keys for moving the driver figure-value distances, two locking blades extending in opposite directions from the driver and each adapted to prevent actuation of the indicators, actuation of all of the indicators being normally prevented by one of said blades, and means for effecting a relative denominational movement between the indicators and said blades to render the latter successively operative.

67. In a typewriter provided with a computing mechanism, the combination with a series of letter and figure types, keys having connections for actuating the types, a carriage, and mechanism controlled by each of said keys for moving the carriage letter space distances, of a computing mechanism including a plurality of indicators, a driver for the indicators, means controlled by the figure keys for moving the driver figure-value distances, means for effecting a relative denominational movement between the driver and indicators, restraining means coöperating with the indicators, and means for adjusting said restraining means relative to an indicator of higher order than the one actuated by the driver without affecting the action of said means on indicators of lower order than the one actuated.

68. In a typewriter provided with a computing mechanism, the combination with a series of letter and figure types, keys having connections for actuating the types, a carriage, and mechanism controlled by each of said keys for moving the carriage letter space distances, of a computing mechanism including a plurality of indicators, a driver for the indicators, means controlled by the figure keys for moving the driver figure value distances, means for effecting a relative denominational movement between the driver and indicators, and restraining means coöperating with the indicators and controlled in operation by said denominational movement, whereby the relation between said means and indicators of higher order than the one actuated by the driver will be successively varied without affecting the relation of said means to indicators of lower order than the one actuated.

69. In a typewriter provided with a computing mechanism, the combination with a series of letter and figure types, keys having connections for actuating the types, a carriage, and mechanism controlled by each of said keys for moving the carriage letter space distances, of a computing mechanism including a plurality of indicators, a driver for the indicators, means controlled by the figure keys for moving the driver figure value distances, means for effecting a relative denominational movement between the driver and indicators, and a blade which is shifted longitudinally by said denominational movement and successively coöperates with the indicators of higher order than the one actuated by the driver to permit said indicators to be easily operated.

70. In a typewriter provided with a computing mechanism, the combination with a series of letter and figure types, keys having connections for actuating the types, a carriage, and mechanism controlled by each of the keys for moving the carriage letter space distances, of a computing mechanism including a plurality of indicators, a driver for the indicators, means controlled by the figure keys for moving the driver figure value distances, and means for effecting a relative denominational movement between the driver and indicators in synchronism with the step by step movements of the carriage, said means permitting the denominational movements to be different than the corresponding movements of the carriage.

71. In a typewriter provided with a computing mechanism, the combination with a series of letter and figure types, keys having connections for actuating the types, a carriage, and mechanism controlled by each of the keys for moving the carriage letter space distances, of a computing mechanism including a plurality of indicators, a driver for the indicators, means controlled by the figure keys for moving the driver figure value distances, means controlled by each of the figure keys for effecting a relative denominational movement between the indicators and the driver controller means, locking means acting to positively prevent rotation of the indicators, carrying devices for transmitting movement from each indicator to the indicator of next highest denomination, and means to release said indicators from the locking means during the driving and carrying operation.

72. The combination with a typewriting machine having a platen, letter and figure type, keys for actuating said type, and means controlled by the keys for effecting a relative step by step movement between the platen and type, of a computing attachment including an element having a step by step movement, an arm connecting said element of the computing attachment with the step by step movable member of the type writer, and devices included in said connection whereby said arm will remain stationary during certain intermediate movements of the step by step movable member of the typewriter.

73. The combination with a typewriting machine having a platen, letter and figure type, keys for actuating said type, and means controlled by the keys for effecting a relative step by step movement between the platen and type, of a computing attachment including a plurality of indicators and a driver, means controlled by the figure keys of the typewriter for actuating the driver figure value distances, and means for intermittingly effecting a relative denominational movement between the driver and indicators in synchronism with movements of the step by step movable member of the typewriter, such relative movement of the driver and indicators being suspended while the machine is actuated to print a decimal point or to move the step by step movable member of the typewriter across the space representing such point.

74. In a typewriter provided with a computing attachment, the combination with a series of letter and figure types, keys having connections for actuating said types, a carriage, and mechanism controlled by each of said keys for moving the carriage letter space distances, of a computing mechanism including a plurality of indicators and a driver, devices for effecting a relative step-by-step movement between the driver and indicators in synchronism with movements of the typewriter carriage, and means for automatically disconnecting said devices from one of said parts on the completion of a predetermined number of said step-by-step movements of the adjustable element of the computing mechanism.

75. In a typewriter provided with a computing attachment, the combination with a series of letter and figure type, keys having connections for actuating said types, a carriage, and mechanism controlled by each of said keys for moving the carriage letter space distances, of a computing mechanism including a plurality of indicators and a driver, devices for effecting a relative step-by-step movement between the driver and indicators in synchronism with movements of the typewriter carriage, and means for automatically disconnecting said devices from one of said parts following the actuation of the indicator of lowest order by the driver, whereby the adjustable element of the computing mechanism will not be affected by subsequent step-by-step movements of the typewriter carriage.

76. In a typewriter provided with a computing attachment, the combination with a series of letter and figure types, keys having connections for actuating said types, a carriage, and mechanism controlled by each of said key for moving the carriage letter space distances, of a computing mechanism including a plurality of indicators and a driver, devices for effecting a relative step-by-step movement between the driver and indicators in synchronism with movements of the typewriter carriage, and adjustable means for automatically rendering said devices inoperative, whereby after a predetermined number of step-by-step movements of the adjustable element of the computing mechanism said element will not be affected by step-by-step movements of the typewriter carriage.

77. In a typewriter provided with a computing attachment, the combination with a series of letter and figure types, keys having connections for actuating said types, a carriage, and mechanism controlled by each of said keys for moving the carriage letter space distances, of a computing mechanism including a plurality of indicators and a driver, devices for effecting a relative step-by-step movement between the driver and indicators in synchronism with movements of the typewriter carriage, and means for automatically restoring the driver and indicators to their original denominational relation following the actuation of the units indicator by the driver at a point between the limits of the step-by-step travel of the typewriter carriage.

78. In a typewriter provided with a computing attachment, the combination with a series of letter and figure types, keys having connections for actuating said types, a carriage, and mechanism controlled by each of said keys for moving the carriage letter space distances, of a computing mechanism including a plurality of indicators and a driver, devices for effecting a relative step-by-step movement between the driver and indicators in synchronism with movements of the typewriter carriage, and means for automatically effecting a reverse denominational movement between the indicators and driver following the actuation of the units indicator by the driver independent of a corresponding movement of the typewriter carriage.

79. In a typewriter provided with a computing attachment, the combination with a series of letter and figure types, keys having connections for actuating said types, a carriage, and mechanism controlled by each of said keys for moving the carriage letter space distances, of a computing mechanism including a plurality of indicators and a driver, and means whereby the operator may predetermine whether or not the driver shall operate the indicators, said means including two coöperating members, one traveling relative to the other so as to come into contact therewith and pass beyond the same while continuing its travel in the same direction, the traveling member of said selection means moving in unison with the typewriter carriage, and one of the members of said means being capable of being set in either active or non-active position.

80. In a typewriter provided with a computing attachment, the combination with a series of letter and figure types, keys having connections for actuating said types, a carriage, and mechanism controlled by each of said keys for moving the carriage letter space distances, of a computing mechanism including a plurality of indicators and a single driver for operating all of the indicators, and means whereby the operator may predetermine whether or not the driver shall operate the indicators, said means including two coöperating members, one traveling relative to the other so as to come into contact therewith and pass beyond the same while continuing its travel in the same direction, the traveling member of said selection means moving in unison with the typewriter carriage, and one of the members of said means being capable of being set in either active or non-active position.

81. In a typewriter provided with a computing attachment, the combination with a series of letter and figure types, keys having connections for actuating said types, a carriage, and mechanism controlled by each of said keys for moving the carriage letter space distances, of a computing mechanism including a plurality of indicators and a driver, one of said elements traveling relatively to the other, and means by which the operator may predetermine whether the connection between the indicators and driver shall be established, said means including two parts, one traveling relatively to the other, one of said parts when set to engage the other being effective thereon for a limited distance to establish the connection between the indicators and the driver but being ineffective thereon during further movement in the same direction.

82. The combination with typewriting mechanism, of adding mechanism including means for setting up the digits of a number to be added, means for operating the adding mechanism in accordance with the number set up, a power actuated device for actuating said operating mechanism, and means controlled automatically by the typewriting mechanism for bringing said device into position for operation.

83. In a printing and adding machine, the combination of a series of registering elements; means for setting up numbers to be added on said registering elements; means for printing said numbers; means for controlling the spacing of the printing; a power-actuated device for actuating said registering elements; and means controlled by said spacing means for bringing said device into position for operation to actuate the registering elements.

84. The combination with a typewriting machine having a platen movable step-by-step and keys in connection for printing letters and figures, a computing attachment comprising a denominational selector, connections between the typewriter carriage and the computing attachment for controlling the operation of said denominational selector, and means for varying the step-by-step action of said denominational selector.

85. The combination with a typewriting machine having a platen movable step-by-step and keys in connection for printing letters and figures, of a computing attachment, a part comprising a denominational selector, an arm on the typewriter carriage for controlling said denominational selector, and devices included in said connection whereby said carriage moves freely independently of said denominational selector, whereby punctuation marks or spaces may be supplied between printed figures.

86. The combination with a typewriter and a traveling carriage, of computing wheels, a master member connected to said carriage and arranged to engage said computing wheels to turn them *seriatim* as determined by the typewriter carriage, and means for automatically breaking and resuming said connection.

87. The combination with a typewriter and computing wheels, of a master wheel arranged to engage said computing wheels *seriatim* to turn them, a source of power constantly tending to turn said master wheel, and means controlled by a member of the escapement of the typewriter for positioning said master wheel to permit said source of power to carry into the computing wheels numbers represented by the keys of the typewriter operated.

88. In a typewriting machine, the combination with numeral keys and computing wheels, of a series of digit selectors arranged to be moved into active position by said numeral keys, a source of power, and means brought into operation by the operation of a key of the typewriter, for causing said source of power to carry into the computing wheels the number represented by the active digit selector.

89. In a typewriting machine, the combination with computing wheels and numeral keys, operating type of a source of power, a denominational selector, means for selecting a digit represented by the numeral key struck, and numeral-key-controlled means for controlling said source of power to cause said source of power to carry into the numeral wheels numbers recorded by the type of the typewriter.

90. In a typewriting machine, the combination with numeral keys and computing wheels, of a universal locking means for holding all said computing wheels normally locked, means for turning said computing wheels to an extent determined by the keys of the typewriter, and means for unlocking by the action of the escapement mechanism of the typewriter every numeral wheel liable to be turned thereby.

91. In a typewriting machine, the combination with type-operating numeral keys and computing members, of a master member arranged to operate said computing members to turn them, a source of power for turning said master member, and a stop member arranged to be coupled to said master member to determine how far said source of power shall turn said master member, and for uncoupling to permit the return movement of said stop member.

92. In a typewriting machine, the combination with a computing member and a source of power, of an idle wheel, an escapement mechanism for the typewriter, and means for coupling said idle wheel to said computing member by said escapement for determining how far said source of power shall turn said computing member, and for uncoupling to permit the return movement of said idle wheel.

93. In a typewriting machine, the combination with numeral keys and computing wheels, of a motor for carrying into the computing wheels numbers represented by the keys struck, means for automatically connecting said keys to operate said wheels, and a key for preventing the operation of said automatic connection.

94. The combination with a typewriting mechanism including a typewriter carriage having a traveling movement, of a computing mechanism having a traveling element, a transposition lever for temporarily connecting said traveling element with said traveling carriage, so as to cause a movement of said traveling element at times during a portion of each line movement of said traveling carriage, whereby the denominations of the numbers as computed will be accorded with the denominations of the numbers as typewritten and means dependent upon the advance of the typewriter carriage for disconnecting said lever.

95. The combination with a typewriting mechanism including a traveling carriage movable to determine the bringing of successive letter spaces to the printing point, of a computing mechanism including a series of computing wheels and a master wheel for driving said computing wheels, said master wheel and said computing wheels having a relative traveling movement to bring said master wheel into register *seriatim* with said computing wheels, means for according the relative traveling movement between said computing wheels and said master wheel with the traveling movement of said carriage, so as to cause the denominations of the digits as computed to correspond with the denominations of the same digits as typewritten, and automatic means for interrupting the coördinating travel of said typewriting mechanism and said computing mechanism at a selectable point in the travel of said carriage.

96. The combination with a typewriting mechanism including a traveling carriage having a step-by-step movement, to afford successive letter spaces, of a computing mechanism including a series of computing wheels and a master wheel for driving said computing wheels, said master wheel and said computing wheels having a relative traveling movement so as to enable numbers to be computed digit by digit, means for coördinating the bringing of said master wheel into register with groups of said computing wheels with the bringing of groups of letter spaces as determined by the carriage to the printing point of the typewriting mechanism, and automatic means for rendering ineffective said last-mentioned means at each of several predetermined points in the travel of said carriage, so as to divide the printed number into groups of figures, said groups separated by letter spaces.

97. The combination with a computing mechanism and a master member relatively movable to bring said master member *seriatim* into register with said computing mechanism, of a traveling carriage, printing means coöperating with said carriage to print the numbers computed, said printing means being arranged also to print commas and decimal points intermediate the digits of the numbers computed, automatic traversing means for effecting the relative movement between said computing mechanism and said master member at the printing and computing of each digit, and automatic means for rendering ineffective said traversing means at the printing of commas and decimal points between the digits.

98. The combination with a computing mechanism having a traveling element, of a typewriting mechanism having a traveling carriage, connections for traversing the traveling element of the computing mechanism from the traveling typewriter carriage, and automatic means for interrupting said connections intermittently a number of times during a single run of said carriage.

99. The combination with a computing mechanism having a traveling element, of a typewriting mechanism having a traveling carriage, connections for traversing the traveling element of the computing mechanism from the traveling typewriter carriage, automatic means for interrupting said connections during a run of said typewriter carriage, and automatic means for restoring said connections.

100. An attachment for a typewriter, comprising a shaft mounted on the typewriter frame, finger levers operating type, a source of power for rotating said shaft, means controlled by said finger levers for releasing said source of power, a series of numeral disks loosely mounted on the shaft, and means for causing the movement of any one of said disks with the shaft.

101. An attachment for a typewriter, comprising a series of numeral-disks, a shaft on which said disks are loosely mounted, a device carried by the shaft for engaging with any one of said disks to cause a rotary motion of the same, actuating devices having connection with the typewriter finger-levers for imparting rotary motion to said shaft, and means carried by the typewriter carriage for causing a longitudinal movement of the shaft, the carriage also having a longitudinal movement independently of the shaft.

102. An attachment for a typewriting machine comprising a series of numeral-disks, a shaft having rotary and longitudinal movement relatively to said disk, each of said disks having a series of notches radiating from the shaft, a single lug on the shaft for engaging in any one of the notches of a disk, a driving shaft, a gear connection between the driving shaft and the first-named shaft, actuating connections between said driving shaft and the finger-levers of the typewriting machine, and means controlled by the machine carriage for moving the first-named shaft longitudinally to carry the lug from one end to the other of the series of disks.

103. The combination of a series of figure keys, each operatively connected to a corresponding type, a master wheel operatively controlled by the keys, a series of adding wheels operable by said master wheel, and means adjustable to render the adding wheels successively operable by said master wheel either at successive imprints of the type or at greater intervals, whereby spaces may or may not be left between the impressions of the types without affecting the adding wheels.

104. The combination of a series of figure keys each operatively connected to a corresponding type, a carriage connected to the keys for spacing movements, a series of substantially equi-distant and concentric adding wheels, a master wheel for operating them, said master wheel being connected to all the keys, and adjustable means for enabling the carriage to operatively connect the adding wheels in regular succession to the master wheel at either equal or unequal intervals in the travel of the carriage.

105. The combination with a typewriting mechanism, including a series of letter types, a series of figure types, keys therefor, and a carriage connected to the keys for letter space movements, of a series of adding wheels, suitable connections from said figure keys to said adding wheels, including a master wheel and an adjustable adding-column gage constructed to connect said adding wheels automatically to said figure keys through said master wheel during the writing of any portion of each line, and to disconnect said adding wheels automatically from said figure keys at all other portions of each line.

106. In a device for printing and adding numbers of a plurality of denominations, the combination of means for printing numbers in a plurality of denominations, a series of adding wheels, one for each denomination, means, including a master wheel for adding on each wheel an amount corresponding to the digit printed in the denominational position corresponding to such wheel, and means adjustable at will to vary the spacing of the printing for the purpose of punctuation.

107. The combination with a typewriting mechanism and an adding mechanism including a set of adding wheels and a master wheel, of means for automatically rendering the set of adding mechanism operative by the master wheel in connection with the typewriting mechanism at a predetermined portion of the line of writing and inoperative at all other portions, said means being adjustable to render said adding wheels operative by the master wheel at different portions of the line of writing.

108. The combination of adding wheels, a master wheel and printing means including keys, and connections between the keys and master wheel whereby the latter is adapted to be actuated when the connections are completed, said connections including a member movable to different positions for varying the connections after each movement so that the printing means are operable to print punctuation points at different intervals for each position of said member without operating the master wheel.

109. The combination with a computing device including a series of adding wheels and a master wheel common to said adding wheels, of a traveling carriage, keys for causing the master wheel to operate the computing device, and means for operatively connecting the keys with the actuator during a predetermined portion of the movement of the carriage and for breaking such connection beyond said portion of the carriage movement.

110. In a combined typewriting and adding machine, the combination with a series of adding wheels rotatable one at a time, printing keys including figure and letter keys, and a step-by-step moving carriage of said typewriting mechanism, of means including a master wheel whereby the extent of rotation of said wheels is controllable by said figure keys, and means whereby the selection of the wheel to be rotated is controllable by the movement of said carriage, the last-mentioned means being adjustable to bring said wheels automatically under the control of said master wheel and keys at any predetermined position throughout the line of writing and the parts being arranged to permit the carriage to pass uninterruptedly in both directions through and beyond the position corresponding to the adding column.

111. In a combined typewriting and computing machine, the combination with a typewriter carriage, of a computing device, a member connected to said computing device, a bar on the typewriter carriage, a lug settable along said bar and engageable by said member, and means for automatically and intermittently permitting relative movement between said member and said lug during each line of writing.

112. In a machine of the class described, the combination of the typewriter carriage, a denomination-controlling carriage, a lever intermediate the two carriages and adapted to be moved by the former to move the latter, means for disengaging the lever and the typewriter carriage, and means for returning the denomination-controlling carriage to initial position.

113. In a machine of the class described comprising a denomination-selecting carriage, the combination of said carriage, a typewriter carriage, a connection effected by the typewriter carriage travel and adapted to communicate the step-motion of the typewriter carriage, to said denomination-selecting carriage, comprising a lever adapted to engage with said carriages, means for disengaging the denomination-selecting carriage from the typewriter carriage, and means for returning the denomination-selecting carriage to normal position.

114. The combination with a typewriter carriage, of denomination determining means including a traveling carriage, a lever intermediate the two carriages and adapted to be moved by the former to move the latter, and means for disengaging the lever from the typewriter carriage brought into operation during the joint movement of said carriages.

115. The combination with a computing mechanism, of a typewriting mechanism, denominational determining means for coordinating the denominations as computed by said computing mechanism with the denominations as typewritten by said typewriting mechanism, including a vibratory lever pivoted intermediate its ends and connecting said means with said typewriting mechanism, and means for silencing said denominational determining means at the writing of a comma or decimal point.

116. In a machine of the character described, the combination of a typewriting machine having a carriage, adding mechanism comprising denomination selecting mechanism, and means for connecting said typewriter carriage with said selecting mechanism comprising a part that moves with said carriage, a coupler connected with said selecting mechanism and arranged to be operated by said part as the carriage moves through the adding column, means operated by the motion of said carriage for disconnecting said coupler from said part at the end of the adding column, and means for restoring said coupler to normal position when so disconnected.

117. In a machine of the character described, the combination of a typewriting machine having a carriage, adding mechanism comprising denomination selecting mechanism, and means for connecting said typewriter carriage with said selecting mechanism comprising a part that moves with said carriage, a coupler connected with said selecting mechanism and arranged to be operated by said part as the carriage moves through the adding column, and a stationary cam for moving said coupler out of the path of said part at the end of the adding column.

118. In a combined typewriting and adding machine, the combination of a stationary framework, keys including numeral keys mounted in said stationary framework, printing instrumentalities mounted in said stationary framework and controlled by said keys for writing any words and numbers, a traveling paper carriage, adding mechanism mounted in a stationary framework and including denomination determining devices, means for coupling said denomination determining devices to said paper carriage when the latter reaches the adding column, connections between said typewriter keys and said adding mechanism, and means for disconnecting said connections when said denomination determining devices reach an extreme of their motion.

119. The combination with a typewriting machine having a carriage, of adding mechanism comprising denominational selecting mechanism, and means for connecting said typewriter carriage to said selecting mechanism, comprising a part moving with said carriage, a coupler connected with said selecting mechanism arranged to be operated by said part as the carriage moves through the adding column, and means operated by the motion of said carriage for positively effecting a relative disconnecting movement between said part and said coupler.

120. The combination with a typewriting machine having a carriage, of adding mechanism comprising denominational selecting mechanism, and means for connecting said typewriter carriage to said selecting mechanism, comprising a part moved with said carriage, a coupler connected with said selecting mechanism arranged to be operated by said part as the carriage moves through the adding column, and a cam brought into play by the motion of said carriage for positively effecting a relative disconnecting movement between said part and said coupler.

121. The combination with a typewriting mechanism including a traveling typewriter carriage moving step by step to determine digit and letter spaces, of a computing mechanism including a traveling element moving step by step to accord the denominations of the digits as computed with the denominations of the same digits as typewritten, and automatic means for effecting a double spacing of the typewriter carriage with a single spacing of the traveling element of the computing mechanism in passing over a punctuation mark between digits of a number being computed.

122. The combination with a platen and printing mechanism, of means including a carriage for effecting the uniform step-by-step advance of one of said elements, a computing device including a carriage, and mechanism including a part adjustable relative to the platen, to effect relative single-step displacement between said carriages at the pointing-off place in a printed number.

123. A computing typewriter combining a platen, a computing device comprising a shiftable element, said platen and element being relatively movable, and a locating device movable into and out of the path of said element.

124. The combination with a computing mechanism including a series of computing wheels and a master wheel for driving said computing wheels seriatim, said computing wheels and said master wheel having a relative movement to bring said master wheel into successive register with each of said computing wheels, of a typewriting mechanism including a traveling carriage, means controlled from said carriage for effecting said relative movement between said computing wheels and said master wheel in one direction, and a spring tensioned during the movement of said carriage for effecting the relative movement between said computing wheels and said master wheel in the opposite direction.

125. The combination of a typewriting machine provided with a set of keys and type bearing the usual characters and a spacing-key, a traveling platen adapted to be moved step by step in its forward movement by the operation of each of said keys, a register or adding device adapted to be actuated by the numeral-keys of said set, traveling driving mechanism for said register connected with and operated by the mechanism for shifting the said platen and moving in response therewith, and means for preventing the shifting of the register-driving mechanism in response to the shifting platen when the punctuating or spacing key is operated to punctuate or space a printed number in its numerical order, substantially as and for the purpose set forth.

126. The combination of a register, driving mechanism for actuating said register and adapted to be shifted from one wheel to the other thereof, a series of numeral-keys for positioning and actuating said register-driving mechanism, means for printing the numerical character of each of the said keys as it is operated, spacing or punctuating mechanism for spacing or punctuating a line of printed figures in certain numerical order, and mechanism for holding at rest the register-driving mechanism when the said spacing or punctuating mechanism is actuated, substantially as and for the purpose set forth.

127. The combination of a register, driving mechanism for actuating any one of the register-number wheels and adapted to be shifted from one of said wheels to the other to actuate it, a series of numeral-keys for actuating said register and each connected with and controlling a type bearing its corresponding numeral character, a traveling platen against which said type print, connections between said numeral-keys and said platen for shifting the latter as each character is printed, connections between said shifting platen and said register-driving mechanism so that they are shifted together upon the operation of each key, spacing or punctuating mechanism for spacing or punctuating the line of printed figures in certain numerical order, and means for preventing the register-driving mechanism from shifting with the platen when the spacing or punctuating mechanism is actuated, substantially as and for the purpose set forth.

128. The combination of a register, a suitably mounted shifting drive-wheel for actuating each of the register-number wheels and adapted to be shifted from one to the other of said wheels, a carriage for said drive-wheel, a series of numeral-keys, and a series of corresponding type operated by said respective keys, a shifting platen against which the type act, connections between said platen and the drive-wheel carriage whereby the two may be shifted together upon the operation of each of said numeral-keys, spacing or punctuating mechanism for spacing or punctuating in certain numerical order the figures constituting a printed number and acting to shift the platen at each operation, and means for preventing the shifting of the said carriage by the movement of the platen when the latter is shifted by the spacing or punctuating mechanism, substantially as and for the purpose set forth.

129. The combination of a number-register, shifting driving mechanism for actuating the different members of said register, a series of numeral-keys for positioning and actuating said register-driving mechanism, a type for each of said numeral-keys bearing the character corresponding thereto and actuated by said key, a shifting platen against which the type act and means for shifting the platen one step upon the operation of each of said numeral-keys, connections between the shifting platen and the shifting register-driving mechanism whereby the latter is advanced a step each time the platen is shifted a step by a numeral key, spacing or punctuating mechanism for shifting the platen one step at each operation, and means for shortening the connection between said platen and register-driving mechanism a distance equal to one step of advance movement of said platen each time said spacing or punctuating mechanism is actuated, substantially as and for the purpose set forth.

130. The combination with a movable typewriter carriage, of a computing mechanism, an actuator for said computing mechanism, and means for enabling a continuous movement of said carriage in one direction to produce an intermittent relative movement of said actuator and computing mechanism.

131. In a combined typewriting and adding machine, the combination with a carriage of a typewriting machine, types, and keys to operate the types and control the carriage, of a series of computing wheels forming part of the computing mechanism, a master wheel to turn said computing wheels, a source of power having means to turn said master wheel, an escapement wheel to control said master wheel, and means to enable said keys to control the action of said escapement; means being connected to said carriage to effect relative step-by-step movement between said master wheel and said computing wheels.

132. In a combined typewriting and computing machine, the combination of a typewriter carriage, computation devices, numeral type-controlling keys, said typewriter carriage being movable into and out of a computing zone, means dependent upon the movement of the carriage into and out of said zone to enable said numeral type-controlling keys to coöperate with said computation devices, whereby when in the computing zone, figures may be both printed and computed, and when on either side of the computing zone said keys may be operated to print without computing, and means for determining whether or not said numeral keys shall coöperate with said computation devices when said carriage is in said computing zone.

133. In a combined typewriting and computing machine, the combination of a typewriter carriage, computation devices, numeral type-controlling keys, said typewriter carriage being movable into and out of a computing zone, means dependent upon the movement of said carriage into and out of said zone to enable said numeral type-controlling keys to coöperate with said computation devices, means being provided for variably locating said zone, whereby, when in the computing zone, figures may be both printed and computed, and when on either side of the computing zone said keys may be operated to print without computing, and means for determining whether or not said numeral keys shall coöperate with said computation devices when said carriage is in said computing zone.

134. In a combined typewriting and computing machine, the combination of numeral keys, types controlled by said keys, a letter-feeding carriage under the control of said keys, a computing mechanism including a master wheel element and a totalizer element or set of dial wheels operable by said master wheel, mechanical connections extending from said keys to said master wheel and actuated by the former to control the latter, said carriage movable both into and out of a computing zone during the writing of a single line, carriage-controlled means for mechanically connecting one of said master wheel and totalizer elements to said carriage to effect relative movement between the master wheel and the totalizer at the letter-feeding movements of the carriage, and carriage-controlled means for disconnecting said elements at the end of said zone; said connecting means being adjustable to locate said zone.

135. The combination of numeral keys, types controlled thereby, a letter-feeding carriage under the control of the keys, computing mechanism including a totalizer and a master wheel, means to enable the keys to control the rotation of the master wheel, driving means connecting said carriage to said computing mechanism, to enable said carriage to effect relative movement between the master wheel and the totalizer at one portion of the travel of said carriage, and means for automatically releasing the carriage from the computing mechanism prior to the completion of the line of writing.

136. The combination of numeral keys, types controlled thereby, a letter-feeding carriage under the control of the keys, computing mechanism including a totalizer and a master wheel, means to enable the keys to control the rotation of the master wheel; and means for connecting said carriage to said computing mechanism, to enable said carriage to effect relative movement between the master wheel and the totalizer at one portion of the travel of said carriage, for automatically releasing the carriage from the computing mechanism prior to the completion of the line of writing, and for automatically reconnecting the carriage to the computing mechanism.

137. The combination of a set of numeral keys, a carriage, a totalizer, a master actuator, a driving connection from the carriage to the master actuator, means dependent upon the movement of the carriage in letter-feeding direction to disconnect it from the master actuator, and means effective upon the return of the carriage to reestablish the connection, prior to writing and computing a new line.

138. The combination of numeral keys, types controlled thereby, a letter-feeding carriage under the control of the keys, computing mechanism including a totalizer and a master wheel, means to enable the keys to control the rotation of the master wheel, driving means connecting said carriage to said computing mechanism, to enable said carriage to effect relative movement between the master wheel and the totalizer at one portion of the travel of said carriage, a cam, a trip, and means dependent upon the movement of the carriage to cause said cam and trip to coöperate to disconnect the carriage from the traveling element of the computing mechanism.

139. The combination of numeral keys, types controlled thereby, a letter-feeding carriage under the control of the keys, computing mechanism including a totalizer and a master wheel, means to enable the keys to control the rotation of the master wheel, driving means connecting said carriage to said computing mechanism, to enable said carriage to effect relative movement between the master wheel and the totalizer at one portion of the travel of said carriage, a cam, a trip, and means dependent upon the movement of the carriage to cause said cam and trip to coöperate to disconnect the carriage from the traveling element of the computing mechanism; said trip being constructed and arranged to return to effective position upon the movement of the carriage to do the next line of writing.

140. The combination of a set of numeral keys, a carriage controlled thereby, computing mechanism including a totalizer and a master wheel, a driving connection from said carriage to said computing mechanism to effect relative step-by-step movement between the totalizer and the master wheel, and means including a part adjustable along the run of the carriage, for effecting disconnection between said carriage and said computing mechanism, prior to further advance of the carriage in letter-feeding direction, for the completion of the line of writing.

141. The combination of a set of numeral keys, a computing mechanism including a totalizer and a master wheel, a carriage controlled by the keys, a mechanical driving connection from the carriage to the computing mechanism to effect relative step-by-step movement between the totalizer and the master wheel while the carriage progresses in letter-feeding direction, and means to coöperate with the carriage to effect successive interruptions between the carriage and the computing mechanism during the progress of the carriage in letter-feeding direction for writing each line; means being provided for affording adjustment of the points at which the interruptions take place.

142. The combination of a set of numeral keys, a carriage, a totalizer, a master wheel, a driving connection from the carriage to the master wheel, means dependent upon movement of the carriage in letter-feeding direction to disconnect it from the master wheel, motive means to return the master wheel to initial position, and means effective upon the return of the carriage to reëstablish the driving connection between the carriage and master wheel.

143. The combination of numeral keys, types controlled thereby, a letter-feeding carriage under the control of the keys, computing mechanism including a totalizer and a master wheel, means to enable the keys to control the rotation of the master wheel, driving means connecting said carriage to said computing mechanism, to enable said carriage to effect relative movement between the master wheel and the totalizer at one portion of the travel of said carriage, a cam, a trip, means dependent upon the movement of the carriage to cause said cam and trip to coöperate to disconnect the carriage from the traveling element of the computing mechanism, a spring to return said traveling element to initial position, and means to reëstablish driving connection between the carriage and said traveling element.

144. The combination of a set of numeral keys, a carriage controlled thereby, computing mechanism including a totalizer, a master wheel, a connection from said carriage to said computing mechanism to effect relative step-by-step movement between the totalizer and the master wheel, means adjustable along the run of the carriage for effecting disconnection between said carriage and said computing mechanism, and motive means to return said computing mechanism to initial position independently of the carriage return.

145. The combination of a movable paper-carriage, a plurality of adding wheels mounted in fixed position relative to the transverse movement of the paper-carriage, a single actuating device common to said adding wheels, and mechanism for relatively shifting and coördinating the actuating device and paper-carriage for a limited travel through an adding zone at any desired point in the travel of the paper-carriage and causing the movements of the paper-carriage to be accompanied by corresponding movements of the actuating device from one adding wheel to another in said zone; the paper-carriage being also movable beyond said zone independently of the actuating device.

146. In a typewriter adding machine having the usual computing members, controlling members therefor, type keys and escapement; and a source of power for actuating the computing device as controlled by the controlling means; said source of power controlled as to its effectiveness upon said computing members by an element of the escapement.

147. In a typewriter adding machine having the usual computing members, controlling members therefor, type keys and escapement; a source of power for actuating the computing device as controlled by the controlling members, and means controlled by said type keys and said escapement, for controlling said source of power as to its effectiveness upon said computing members.

148. In an adding machine, the combination of a key; a lever operated by said key; a rock shaft operated by said lever; means for operating said rock shaft from said lever during a part only of the stroke of the lever; and devices operated by said rock shaft for determining the extent of rotation of the register wheels.

149. In a typewriting and adding machine, the combination of a series of keys; a series of register wheels; rock shafts actuated by said keys; and means for operating one of said rock shafts from its key during a part only of the depression of said key.

In testimony whereof I affix my signature, in presence of two witnesses.

BENJ. M. DES JARDINS.

Witnesses:
JAMES A. WATSON,
W. CLARENCE DUVALL.